(12) United States Patent
Monzidelis et al.

(10) Patent No.: US 11,932,344 B2
(45) Date of Patent: *Mar. 19, 2024

(54) POWERED WHEELED RIDING DEVICE

(71) Applicant: MVN Entertainment L.P., Bellmore, NY (US)

(72) Inventors: Mia Monzidelis, Bellmore, NY (US); Chris Monzidelis, Bellmore, NY (US); Stephen Goodhand, Montreal (CA)

(73) Assignee: MVN Entertainment L.P., Bellmore, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/095,103

(22) Filed: Jan. 10, 2023

(65) Prior Publication Data

US 2023/0249777 A1   Aug. 10, 2023

Related U.S. Application Data

(63) Continuation of application No. 17/653,058, filed on Mar. 1, 2022, now Pat. No. 11,548,583, which is a
(Continued)

(51) Int. Cl.
*B62K 13/08* (2006.01)
*B62J 45/20* (2020.01)
(Continued)

(52) U.S. Cl.
CPC .............. *B62K 13/08* (2013.01); *B62J 45/20* (2020.02); *B62K 5/01* (2013.01); *B62K 11/007* (2016.11);
(Continued)

(58) Field of Classification Search
CPC ........ B62K 5/01; B62K 11/02; B62K 11/007; B62K 13/08; B62K 2204/00; B62J 45/20
See application file for complete search history.

(56) References Cited

U.S. PATENT DOCUMENTS

| 1,489,701 A | 4/1924 | Geiser |
| 2,167,937 A | 8/1939 | Clanton |

(Continued)

FOREIGN PATENT DOCUMENTS

| CN | 105270527 A | 1/2016 |
| CN | 105857471 A | 8/2016 |

(Continued)

OTHER PUBLICATIONS

International Search Report on related PCT Application No. PCT/US2020/029033 from International Searching Authority (KIPO) dated Aug. 18, 2020.
(Continued)

*Primary Examiner* — Tony H Winner
(74) *Attorney, Agent, or Firm* — KOS IP Law LLP

(57) ABSTRACT

A powered wheeled riding device is configured to receive left and right foot inputs from a user and in response control a left motor and a right motor to move respective left and right wheels forwardly and backwardly consistent with the left and right foot inputs in order to steer the device without changing a direction of the wheels relative to a frame of the riding device. The riding device has at least one rear wheel that is not powered. The rear wheel is mounted on a wheel mount that rotates freely about a vertical axis so that the rear wheel freely is directed in any direction.

31 Claims, 26 Drawing Sheets

Related U.S. Application Data continuation of application No. 16/853,739, filed on Apr. 20, 2020, now Pat. No. 11,433,966.

(60) Provisional application No. 62/836,651, filed on Apr. 20, 2019, provisional application No. 63/006,344, filed on Apr. 7, 2020.

(51) Int. Cl.
- *B62K 5/01* (2013.01)
- *B62K 11/00* (2006.01)
- *B62K 11/02* (2006.01)
- *B62K 23/08* (2006.01)

(52) U.S. Cl.
CPC .............. *B62K 11/02* (2013.01); *B62K 23/08* (2013.01); *B62K 2204/00* (2013.01)

(56) References Cited

U.S. PATENT DOCUMENTS

| | | |
|---|---|---|
| 2,196,274 A | 4/1940 | Halsal |
| 3,237,956 A | 3/1966 | See |
| 3,370,861 A | 2/1968 | Lenta |
| 3,514,117 A | 5/1970 | Olsen |
| 4,063,607 A | 12/1977 | Patrick |
| 4,546,989 A | 10/1985 | Peterson |
| 4,561,514 A | 12/1985 | Yamada |
| 4,746,132 A | 5/1988 | Eagan |
| 6,412,787 B1 | 7/2002 | Pardi |
| 6,435,535 B1 | 8/2002 | Field |
| 7,222,866 B1 | 5/2007 | Cahoj |
| 8,738,278 B2 | 5/2014 | Chen |
| 8,825,254 B2 | 9/2014 | Kobashi |
| 8,827,279 B1 | 9/2014 | Clark |
| 9,376,155 B2 | 6/2016 | Ying |
| 9,403,573 B1 | 8/2016 | Mazzei |
| 9,452,802 B2 | 9/2016 | Ying |
| 9,630,674 B2 | 4/2017 | Desberg |
| 9,688,340 B1 | 6/2017 | Kroymann |
| 9,744,095 B1 | 8/2017 | Mazzei |
| 9,757,290 B1 | 9/2017 | Scognamiglio |
| 9,957,006 B2 | 5/2018 | Tinaphong |
| 9,988,114 B1 | 6/2018 | Freakes |
| 10,167,036 B2 | 1/2019 | Ying |
| 10,167,038 B2 | 1/2019 | Kim |
| 10,245,517 B2 | 4/2019 | Cyr |
| 10,286,977 B1 | 5/2019 | Haenel |
| 10,800,472 B2 | 10/2020 | Shang |
| 2002/0125653 A1 | 9/2002 | Fagan |
| 2005/0288111 A1 | 12/2005 | Cowan |
| 2007/0131461 A1 | 6/2007 | Treadwell |
| 2010/0237645 A1 | 9/2010 | Trainer |
| 2011/0303475 A1 | 12/2011 | Kim |
| 2013/0062857 A1 | 3/2013 | Winter, V |
| 2013/0238231 A1 | 9/2013 | Chen |
| 2014/0008138 A1 | 1/2014 | Kim |
| 2014/0020962 A1 | 1/2014 | Quick |
| 2015/0115558 A1 | 4/2015 | Desberg |
| 2017/0203811 A1 | 7/2017 | Germanovsky |
| 2017/0225736 A1 | 8/2017 | Chen |
| 2018/0029662 A1 | 2/2018 | Acciardi |
| 2018/0127047 A1 | 5/2018 | Lankford |
| 2018/0127048 A1 | 5/2018 | Li |
| 2018/0141609 A1 | 5/2018 | Newhouse |
| 2018/0272238 A1 | 9/2018 | Cyr |
| 2019/0023344 A1 | 1/2019 | Shang |
| 2019/0382065 A1 | 12/2019 | Shang |

FOREIGN PATENT DOCUMENTS

| | | |
|---|---|---|
| CN | 205952180 U | 2/2017 |
| CN | 107128413 A | 9/2017 |
| CN | 108382512 A | 8/2018 |
| CN | 108528595 A | 9/2018 |
| CN | 207985073 U | 10/2018 |
| CN | 108860408 A | 11/2018 |
| CN | 108945235 A | 12/2018 |
| JP | 2005022631 A | 1/2005 |
| WO | 2008055009 A2 | 5/2008 |
| WO | WO 2018-032405 A1 | 2/2018 |

OTHER PUBLICATIONS

Written Opinion on related PCT Application No. PCT/US2020/029033 from International Searching Authority (KIPO) dated Aug. 18, 2020.

Extended European Search Report dated Dec. 23, 2022 issued in corresponding EP Appln. No. 20795667.3.

Gidygo Kids Ride on Walking Unicorn Rocking Horse Riding Toy for Children—Amazon.com—https://www.amazon.com/dp/B07RZW3GRK?tag=happygabby-20&linkCode=ogi&th=1.

Ride-on Animals—https://www.youtube.com/watch?v=C8f-G2ctMbc.

Amazon.com: Evaxo Pony Rider with Gallop & Go Pony Action : Toys & Games; https://www.amazon.com/Evaxo-Pony-Rider-Gallop-Action/dp/B07ZS6PVM4/ref=asc_df_B07ZS6PVM4/?tag=hyprod-20&linkCode=dfO&hvadid=385177046112&hvpos=&hvnetw=g&hvrand=13951728 . . . ; dated Jun. 29, 2023.

Boots TM: Plush Ride-On Pony Toy with Wheels; https://www.radioflyer.com/boots-rolling-pony.html; dated Jun. 29, 2023.

POWERED WHEELED RIDING DEVICE

CROSS-REFERENCE TO RELATED APPLICATIONS

The present application is a continuation of U.S. patent application Ser. No. 17/653,058 filed on Mar. 1, 2022, now U.S. Pat. No. 11,548,583, which is a continuation of U.S. application Ser. No. 16/853,739, filed on Apr. 20, 2020, now U.S. Pat. No. 11,433,966, which claims priority to U.S. Provisional Application No. 62/836,651, filed Apr. 20, 2019, and U.S. Provisional Application No. 63/006,344, filed Apr. 7, 2020. The entirety of each of these priority applications is hereby incorporated by reference.

BACKGROUND

The present disclosure relates to the field of powered wheeled riding toys.

Wheeled riding toys, such as wheeled riding horses, are well known. In such toys, a child sits on a saddle of a horse. Wheels are disposed at all four feet of the horse, which has a rigid internal frame for supporting the rider. As such, the rider can ride the horse, propelling it around using her feet. While this can be fun for some, users tend to become bored of toys taking this approach.

Two-wheeled self-balancing scooters, also often referred to as hoverboards, are also well-known. A typical hoverboard includes a right part and a left part that each have a wheel and a footpad. A user typically stands upon the footpads, and electronics, such as sensors, detect user foot movements. A hoverboard controller directs control of motors driving the wheels based on such user inputs. Although popular, hoverboards have a limited versatility.

SUMMARY

The present specification describes embodiments employing technological aspects of self-balancing scooters and thematic wheeled riding toys.

In accordance with one embodiment the present specification provides a powered wheeled riding device, comprising a riding toy portion comprising a frame structure supporting a saddle configured to support a rider thereupon and defining a plurality of back legs, a wheel structure attached to each of the back legs, each wheel structure having a rolling wheel and a rotating mount configured so that the rolling wheel can rotate into any rolling direction, and a powered, wheeled, self-balancing scooter comprising left and right footpads, the scooter configured to receive rider inputs via the footpads. The scooter can attached to the frame structure so that the riding toy portion moves together with the scooter.

In some embodiments the scooter is rigidly attached to the frame. In some such embodiments the frame defines a plurality of front legs, and the front legs are disposed in front of the scooter. In additional embodiments the scooter footpads are positioned in front of the saddle but behind the front legs. In additional embodiments a mount post extends between the scooter and a mount structure disposed in a body of the frame. In further such embodiments the scooter comprises a right part and a left part that are rotatable relative one another, and an insert is disposed between the right part and the left part, and wherein the mount post is connected to the insert.

In additional embodiments a toy controller in the riding toy portion communicates with a scooter controller in the scooter, the scooter controller adapted to control movement of the scooter and communicating movement data concerning the scooter to the toy controller, and the toy controller is configured to actuate one or more effects on the riding toy portion based on the movement data. In some such embodiments the toy controller is configured to direct the scooter controller to control movement of the scooter in accordance with one of a plurality of control modes. In further embodiments the toy controller is configured to communicate wirelessly with a remote computing device so that the remote computing device can configure operation of the toy controller.

In accordance with another embodiment the present specification provides a thematic structure configured for use with a powered self-balancing scooter, comprising a connector configured to attach to the self-balancing scooter, a post extending from the connector, and a thematic element supported by the post and configured to be held by a user standing on the self-balancing scooter. The post is attached to the connector at a joint configured so that the post can be moved relative to the connector without affecting operation of the scooter.

In accordance with yet another embodiment the present specification provides a powered wheeled riding device, comprising a riding toy portion comprising a frame structure supporting a saddle configured to support a rider thereupon and defining a plurality of back legs and left and right front legs, a wheel structure attached to each of the back legs, each wheel structure having a rolling wheel and a rotating mount configured so that the rotating mount can rotate freely about a vertical axis, a left motor configured to rotate a left wheel and being attached to the left front leg, a right motor configured to rotate a right wheel and being attached to the right front leg, a right foot receiver configured to receive a user right foot and comprising a right foot input configured to receive a forward or backward user right input, a left foot receiver configured to receive a user left foot and comprising a left foot input configured to receive a forward or backward user left input, and a controller configured to direct the left and right motors to turn the respective left and right wheels in accordance with the user left input and user right input.

In accordance with a still further embodiment, the present specification provides a powered wheeled riding device in which front wheels do not rotate to steer, but are independently controlled so as to steer by relative movement of the wheels, and rear wheels are not powered and are configured to rotate freely in any direction so that the riding device moves with the powered front wheels.

In some such embodiments user inputs for controlling the powered front wheels are obtained from user foot inputs.

In other embodiments user inputs for controlling the powered front wheels are obtained from user inputs from a user's hands.

In accordance with yet another embodiment, the present specification provides a thematic accessory that is selectively attachable to a two-wheeled, self-balancing scooter.

DESCRIPTION

Figure 1:
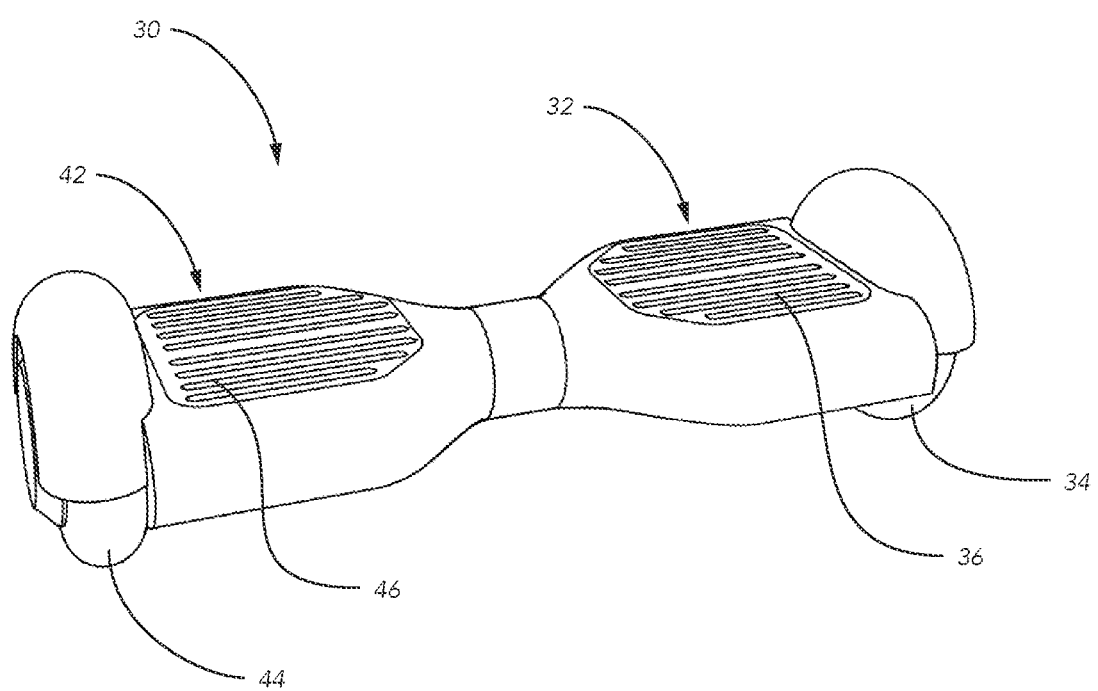
FIG. 1 is a perspective view of a typical self-balancing scooter.

With initial reference to FIG. 1, a typical self-balancing scooter 30, often referred to as a hoverboard, includes a right part 32 with a right wheel 34 and a right footpad 36, and a left part 42 with a left wheel 44 and a left footpad 46. A user typically stands upon the footpads 36, 46. Electronic components, such as sensors, detect user foot movements. A scooter controller, comprising a microprocessor, receives signals indicative of such foot movements, and directs control of motors driving the wheels based on such user inputs. For instance, a user stands on the scooter 30, which is directed to move forward if the user leans forward, and move backward when the user leans backward. In the illustrated embodiment, the opposing right and left parts 32, 42 of the scooter 30 twist relative to one another in accordance with user inputs to the footpads 34, 44. If, for example, the right part 32 is rotated forwardly and the left part 42 simultaneously rotated backwardly, the right wheel 36 will move forwardly and the left wheel 46 will move backwardly so that the scooter 30 will turn and/or twist to the left (counterclockwise.

Figure 2:
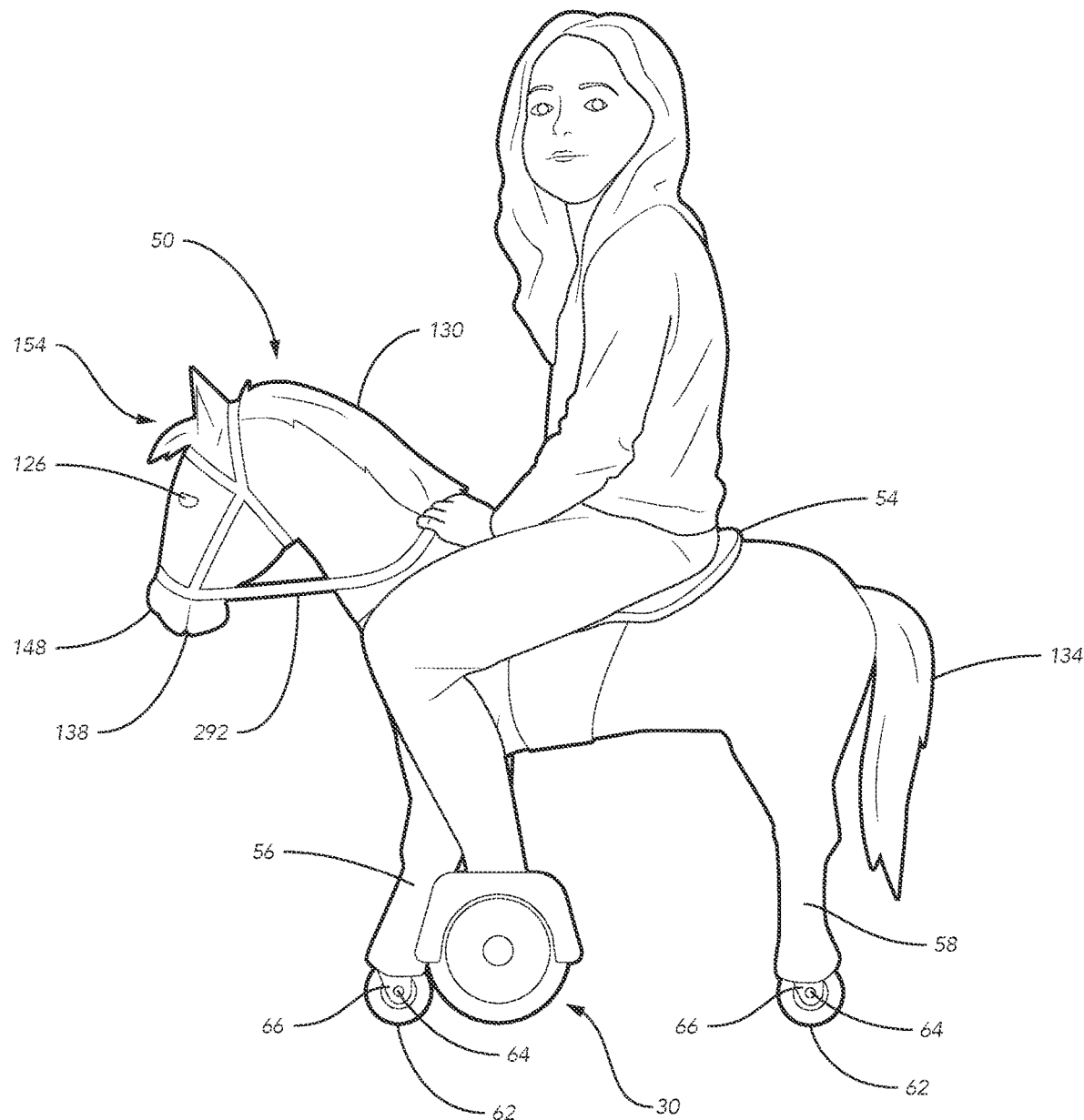
FIG. 2 is a side view of an embodiment of a user riding a thematic wheeled riding toy in combination with a self-balancing scooter.
Figure 3:
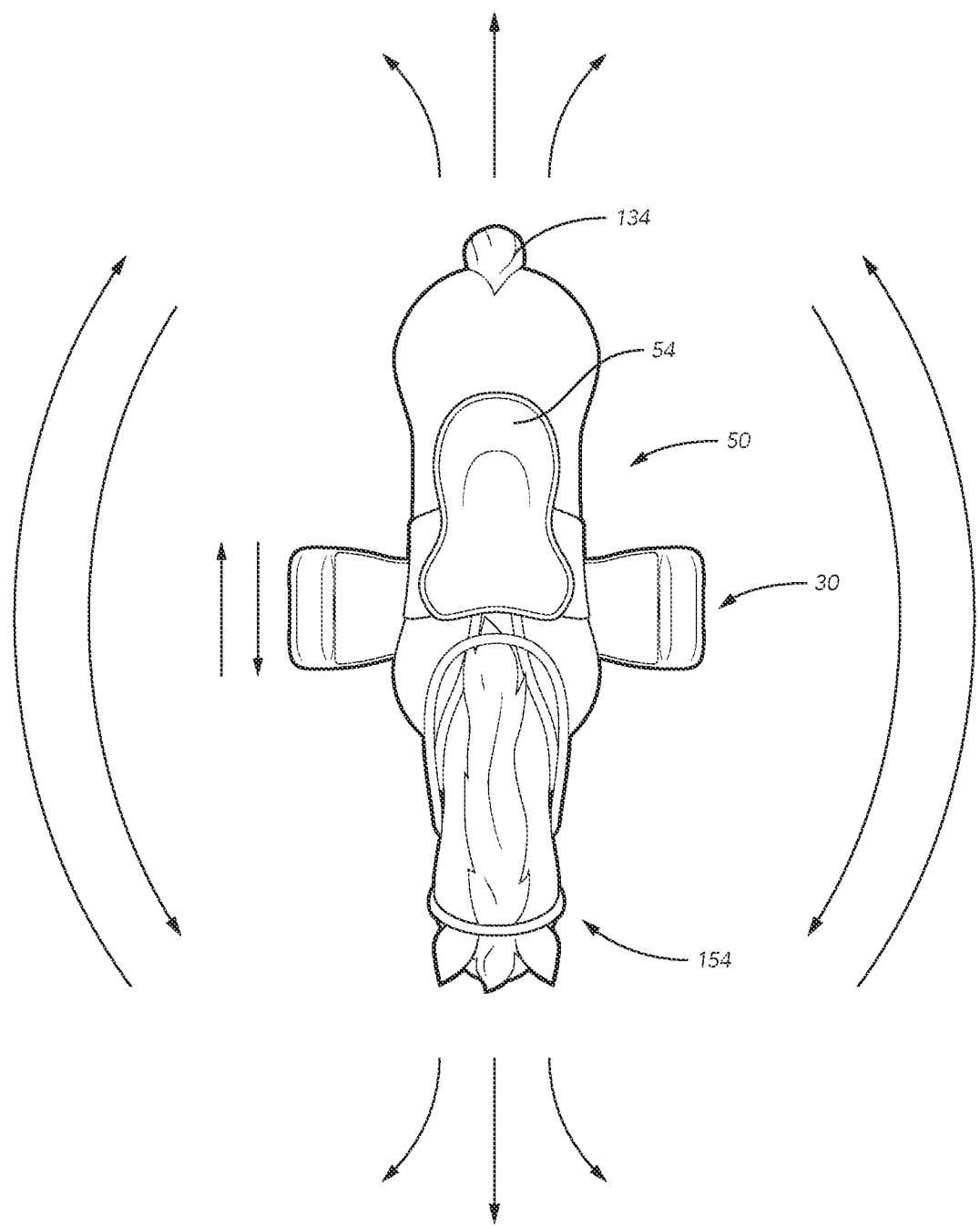
FIG. 3 is a top view of the configuration of FIG. 2 showing options for movement of the configuration.
Figure 4:
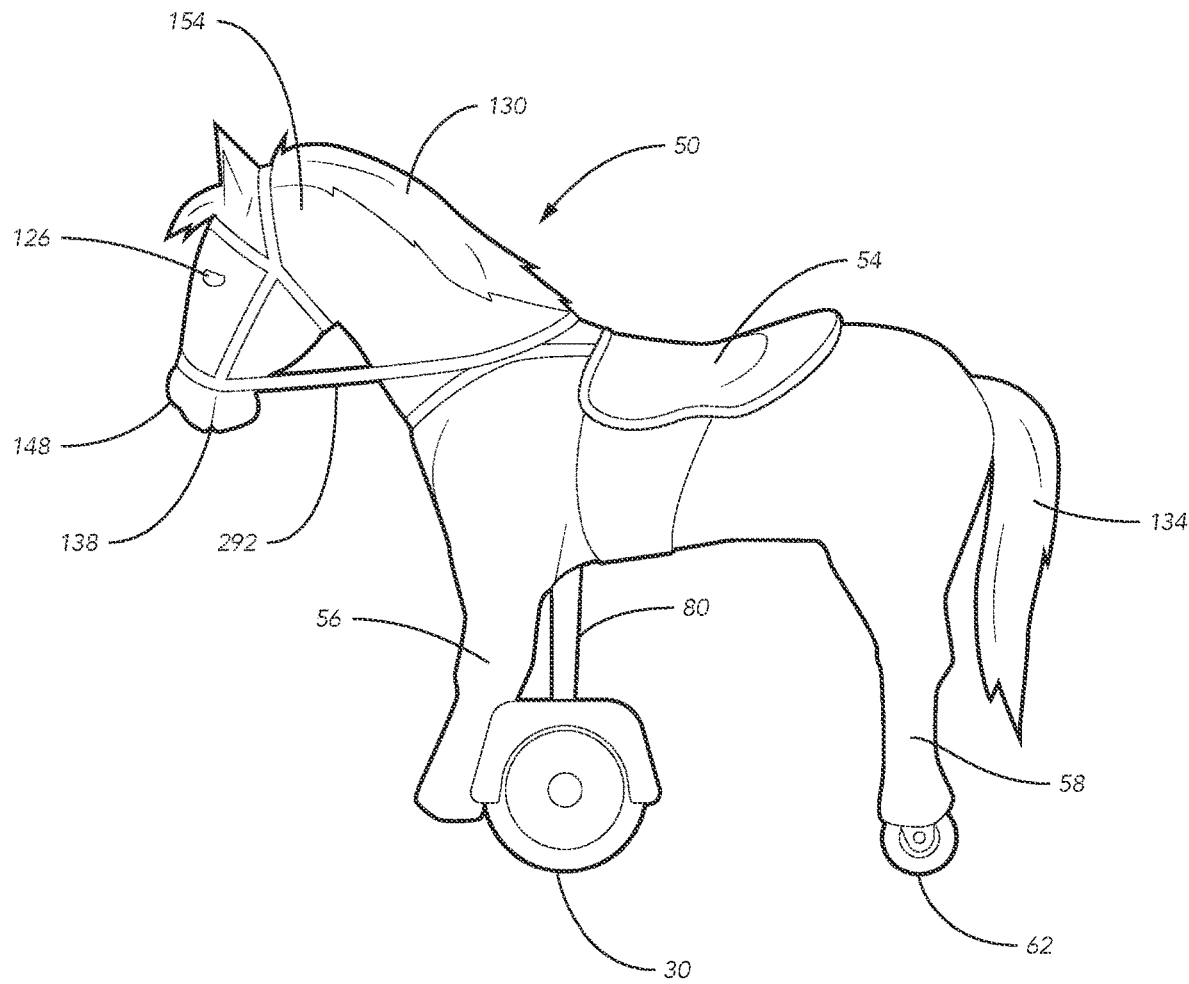
FIG. 4 is a side view of another embodiment in which a thematic wheeled riding tow is rigidly attached to a self-balancing scooter.
Figure 5:
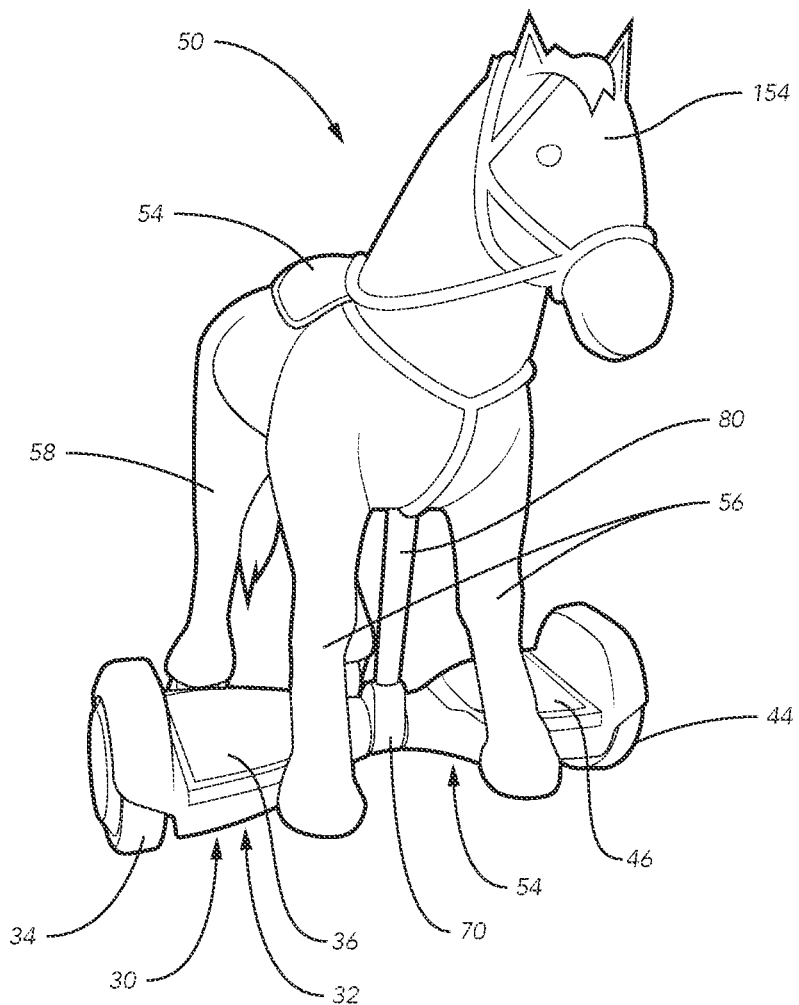
FIG. 5 is a perspective view of the configuration of FIG. 4.
Figure 6:
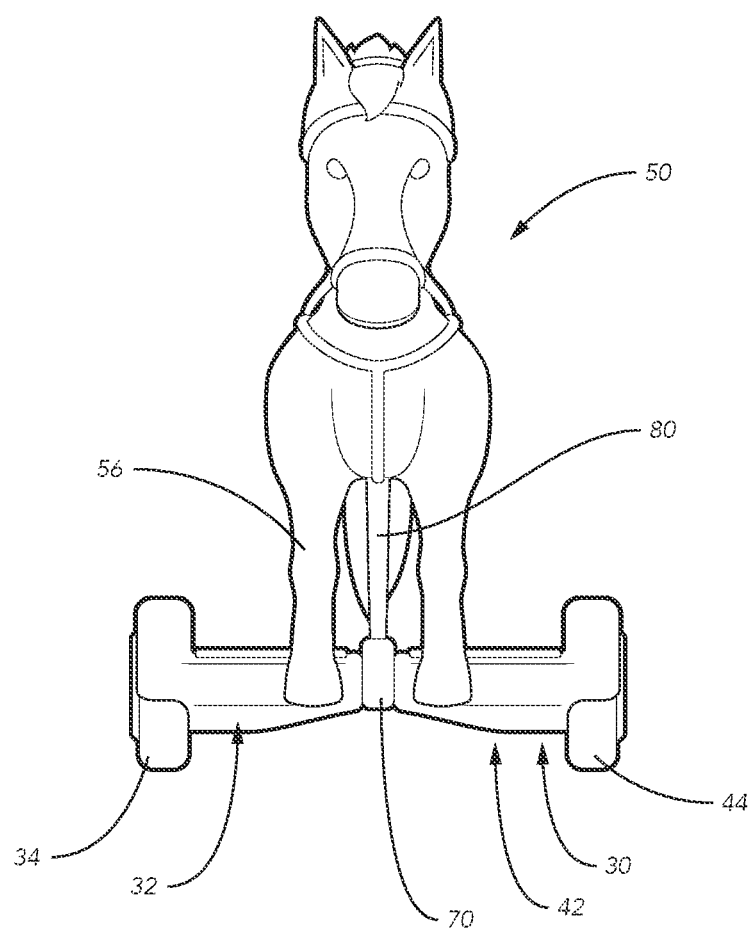
FIG. 6 is a front view of the configuration of FIG. 4.

With reference next to FIGS. 2 and 3, in one embodiment, a two-wheeled self-balancing scooter 30 can be used in conjunction with a wheeled riding toy 50. As shown, the wheeled riding toy 50 is configured about the theme of a horse. A frame 60 (see FIG. 7) supports a saddle 54 upon which a user can sit. Wheels 62 are disposed at each of the front and rear legs 56, 58. Each wheel 62 rotates about an axle 64 supported by a wheel mount 66. Preferably each wheel mount 66 is rotatable relative to the associated leg so that each wheel 62 can freely rotate about a substantially vertical axis. In one preferred embodiment the wheel mounts 66 and wheels 62 are casters. In the illustrated embodiment the scooter 30 is arranged immediately behind the front legs 56 of the riding toy 50 so that the user's feet rest upon the footpads 34, 44 at a location similar to where a user's feet would be arranged in stirrups on a real horse—below and slightly forwardly of the saddle 54.

As the user controls the scooter 30 via foot inputs, the riding toy 50 follows the movement of the scooter 30. For example, as indicated in FIG. 3, the riding toy 50 moves forward and backward, turns right and left, and even spins in accordance with inputs provided to the scooter 30 from the user.

In the embodiment illustrated in FIGS. 2 and 3, the riding toy 50 is independent of the scooter 30, and there is no direct physical or electrical connection between them other than through the rider. In additional embodiments the front legs 56 of the riding toy 50 can be connected to the scooter 30 so as to provide a physical connection helping scooter 30 to direct and control movement of the riding toy 50. Such a connection can take many forms. For example, in some embodiments, a strap can extend from the front legs to and around the scooter so that the left and right parts of the scooter move without restriction. In other embodiments one or more of the front legs can be attached to a casing and/or chassis of the scooter so as to physically and rigidly connect the riding toy to the scooter, enhancing the direct correlation between movement of the scooter and the riding toy.

With reference next to FIGS. 4-11, another embodiment is illustrated in which an insert 70 is disposed between the left and right parts 32, 42 of the scooter 30 and is configured to rotate about an axle 72 of the scooter 30, but is constrained to not rotate about any other axes. Preferably, the insert 70 does not rotate with either scooter part 32, 42 (within a range of operation). A post 80 extends upwardly from the insert 70 to support the riding toy 50. With the post 80 rigidly attached to the insert 70 and riding toy 50, the front legs 56 of the riding toy 50 preferably are in front of the scooter 30 and are raised above the ground, with no wheels. The back legs 58 remain supported by wheels 34, 44 that are rotatable about a vertical axis—or the axis of the back legs 58—so as to allow the riding toy 50 to continue to follow the movements of the scooter 30, including turns and spinning. Preferably the rear wheels 58 play no role in steering or determining direction of the riding toy 50.

Figure 7:
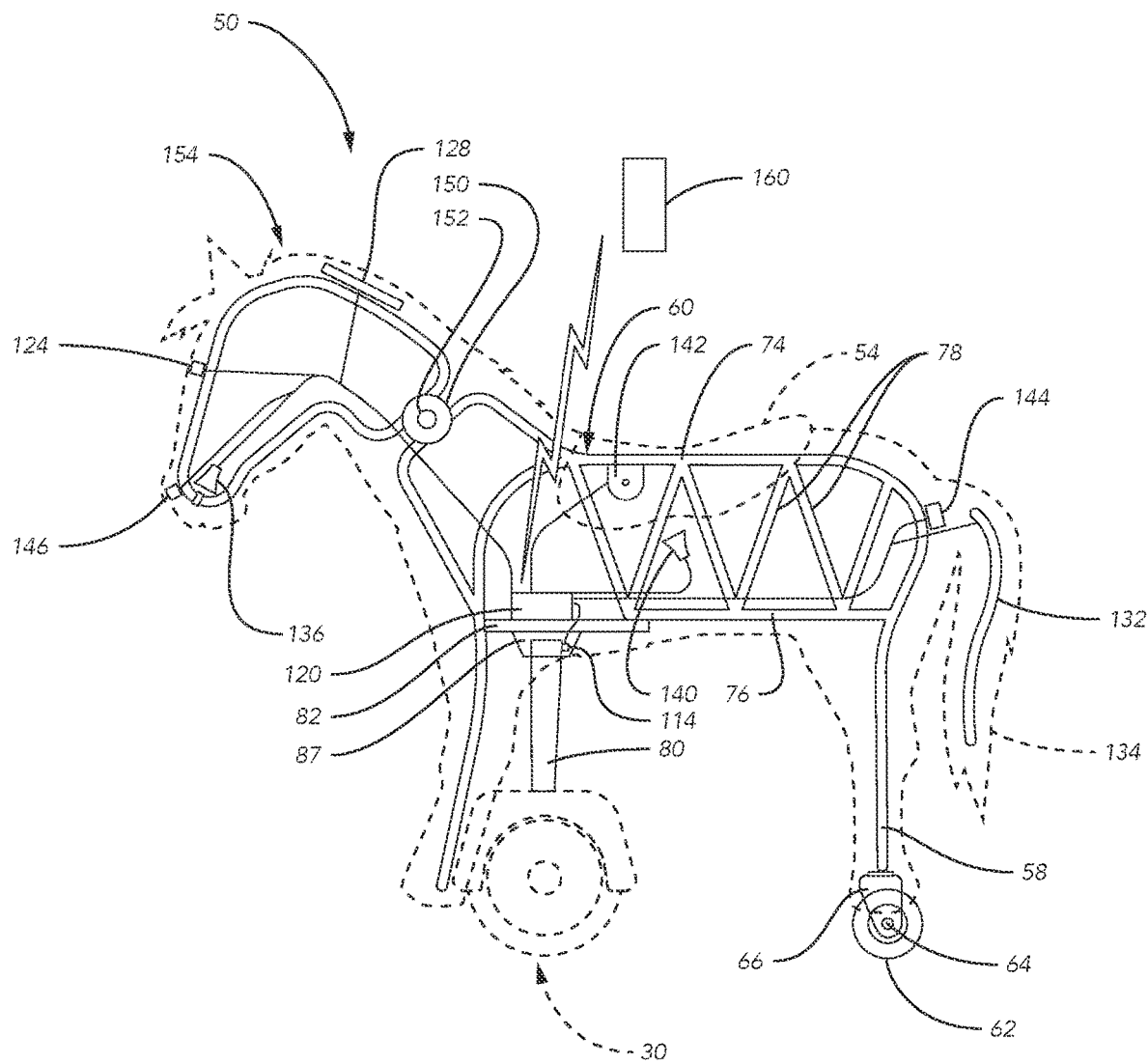
FIG. 7 is a side view of the configuration of FIG. 4 showing the interior of the configuration with the thematic elements in ghost lines.
Figure 8:
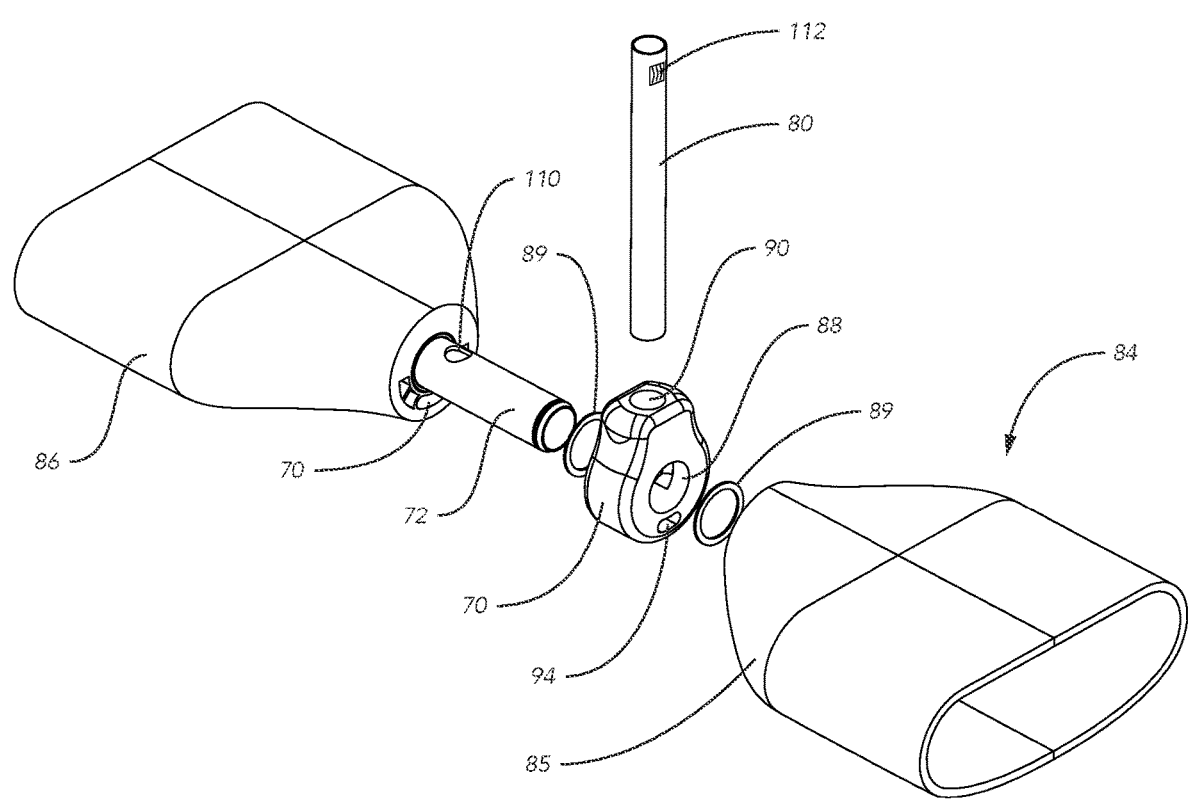
FIG. 8 is an exploded perspective view of certain elements of a self-balancing scooter configured in accordance with one embodiment.
Figures 9, 10:
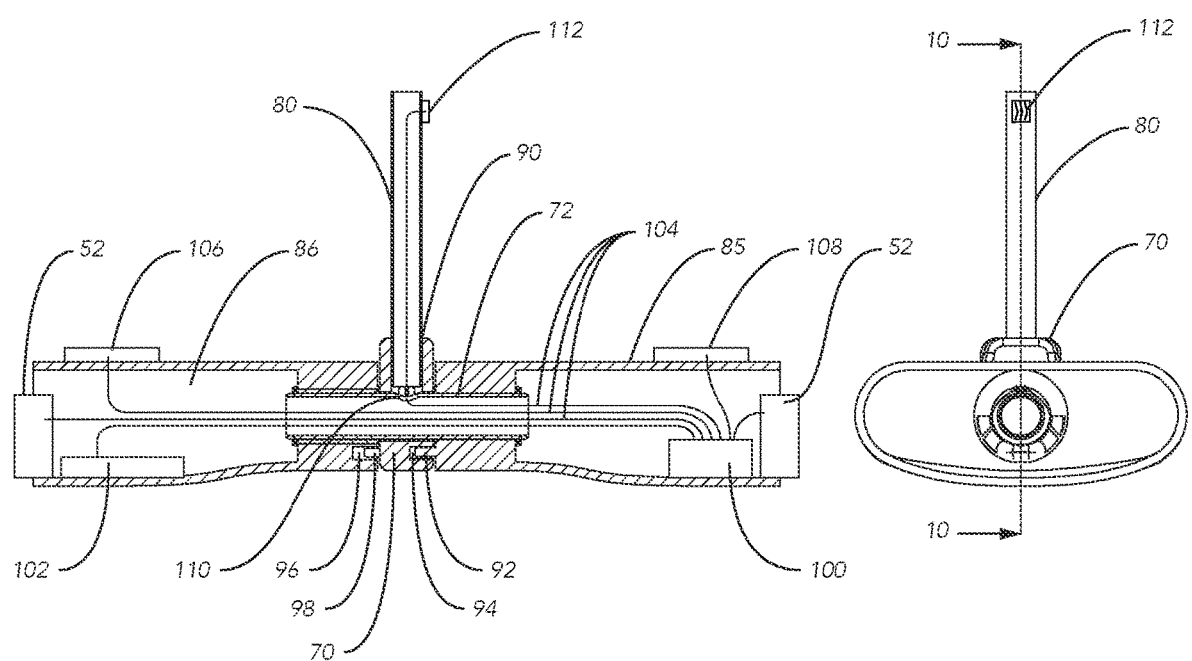
FIG. 9 is an end view of the configuration of FIG. 8.
FIG. 10 is a cross-sectional view taken through line 10-10 of FIG. 9.
Figure 11:
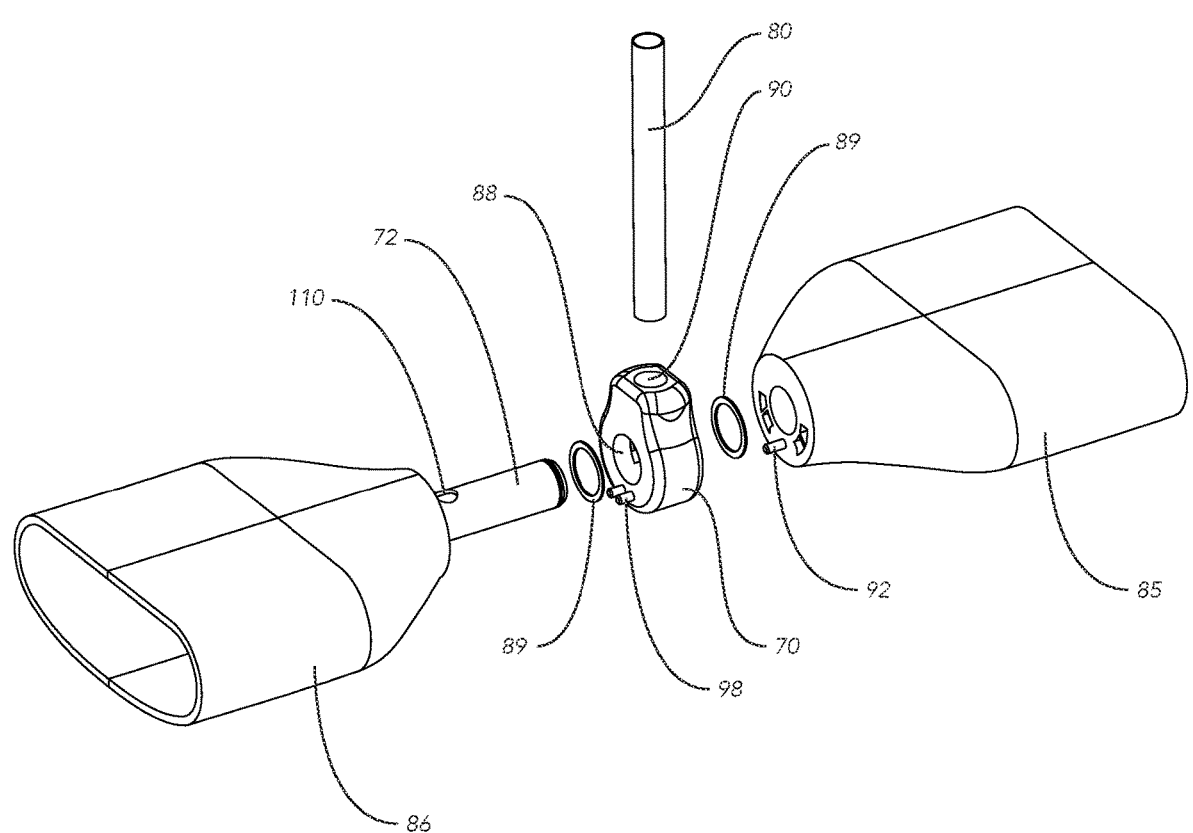
FIG. 11 is another exploded perspective view of the configuration of FIG. 8.

With specific reference to FIG. 7, in a preferred embodiment, the riding toy 50 comprises a frame structure 60 comprising a plurality of upper frame elements 74 and lower frame elements 76 that can be interconnected by struts 78. A support plate 82 comprises a mount structure 83 configured to receive the post 80. The frame 60 is configured to maintain a themed appearance (i.e., horse, dragon, unicorn, elephant, camel, car, spacecraft, etc.), support a user on a saddle 54 of the themed riding toy 50, and safely and effectively transmit motion of the scooter 30 to the riding toy 50 and to the rear legs 58 so that the riding toy 50 moves in concert with the scooter 30.

With particular reference to FIGS. 8-11, in one embodiment, parts of a typical scooter can be retrofitted to support the mount post 80. As shown, a scooter chassis 84 comprises left and right chassis parts 85, 86 that are rotatably connected to one another via the axle 72. In the illustrated embodiment, the axle 72 is lengthened relative to a stock scooter, and extends through an axle receiver 88 formed in the insert 70, which is disposed over the axle 72. Washers 89 are arranged over the axle 72 on either side of the insert 70. A post receiver 90 is arranged on a top of the insert 70, and is shaped and configured to receive the mount post 80.

In typical scooters, a pin on the right part 85 of the chassis fits into a slot in the left part 86 in order to limit rotation of the chassis parts relative to one another over an operating range. In the illustrated embodiment, a pin 92 extends from the right part 85 of the chassis 84, and a slot 94 is formed in the insert 70. Preferably the insert slot 94 is about half the length of a typical slot in a left part 86 of the chassis, while a slot 96 in the left part 86 remains the normal length. In the illustrated embodiment, the insert 70 has two pins 98 configured to fit into the left part slot 96. The pins 98 are configured to enable travel about half the length of a typical slot. Thus, in this configuration, the total operating rotation between the left and right parts 85, 86 with the insert 70 in place will be about the same as would be the case in a stock scooter without the insert. It is to be understood that other specific structures can be employed to achieve such an effect.

When the riding toy 50 is mounted to the scooter 30 via the post 80, the riding toy 50 moves with the scooter 30. The mount post 80 communicates movement of the scooter 30 to the frame 60, which preferably is sufficiently rigid to communicate such movement through the back legs 58 and to the wheel mounts 66 which, due to their caster-like ability to rotate freely about an axis of the legs (and/or a vertical axis), position the wheels 62 to roll as directed by the motion communicated by the scooter 30. As such, a user seated on the riding toy 50 with her feet on the scooter 30 can, by manipulating her feet on the scooter 30 foot pads 36, 46, control movement of the riding toy 50.

With continued reference to FIGS. 8-11, the scooter 30 preferably includes various electronic components, including, for example, a controller 100 comprising a processor having a memory. A battery 102 supplies power. Wires 104 communicate from the controller 100 to such electronics, including passing through the axle 72, which preferably is hollow. For example, left and right footpad sensors 106, 108 sense user inputs and communicate them to the controller 100. Preferably, an axle aperture 110 is formed through the axle 72 and is aligned with the post receiver 90 of the insert 70. Wiring extends from the controller 100 through the axle aperture 110 into the post receiver 90 and the post 80, terminating in an electronic connector 112 formed on the post 80. Of course, in other embodiments such wiring can terminate in a different type of connector, such as a free-hanging connector.

With additional reference to FIG. 7, the mount structure 83 of the riding toy 50 preferably also has an electronic connector 114 that is complementary to the post connector 112. Thus, when the post 80 is received in the mount structure 83, the electronic connectors 112, 114 are engaged. Wiring extends from the mount structure electronic connector 114 to a riding toy controller 120, which preferably includes a microprocessor having a memory. As such, the toy controller 120 is electronically connected to the scooter controller 100. In a preferred embodiment, the toy controller 120 receives power and control data from the scooter controller 100. As such, the toy controller 120 is informed of the movement data of the scooter 30, and thus is aware of how the riding toy 50 is moving (i.e. forward, back, fast, slow, turning, twisting, and the like).

With specific reference again to FIG. 7, preferably the riding toy 50 comprises a plurality of effects, such as visual, aural, and tactile effects, that are connected to, powered, and controlled by the toy controller 120, preferably using power supplied by the attached scooter's battery 102. For example, a first lighting effect 124 can be a cluster of LED lights positioned at the horse's eyes 126, while a second lighting effect 128 can include a strip of lights located along the horse's mane 130 (or a unicorn's horn, car's dashboard, or the like), and a third lighting effect 132 can comprise a strip of lights extending along the horse's tail 134. A first speaker 136 can be located adjacent the horse's mouth 138 so as to simulate neighing, snorting, and the like, and a second speaker 140 located within the body below the user. A tactile effect, such as a vibrating motor 142, can be attached to the horse's saddle 54 and/or the frame 60 adjacent the saddle, and a second tactile effect 144 can comprise a motor configured to shake the horse's tail 134. Another tactile effect can comprise a smoke generator 146 placed adjacent the horse's nostrils 148. Still another tactile effect can include a motor 150 placed at a hinge joint Still another tactile effect can include a motor 150 placed at a hinge joint 152 in the horse's neck and configured to rotate the horse's head 154 up and down.

In some embodiments, the toy controller 120 will actuate one or more of the effects depending on data received from the scooter controller 100. For example, when the scooter data indicates that the toy 50 is moving forward, the controller will turn on the horse's eye lights 124, trigger "moving" lights 128 on the mane 130, and actuate the body speaker 140 to make the clip-clop of horse's hooves. And when the scooter data indicates that the scooter is moving at full speed the toy controller 120 will increase the speed of the hoof sounds emitted by the body speaker 140, increase the speed of the moving lights 128, and periodically actuate the smoke generator 146 to blow smoke from the nostrils 148. If the user then changes inputs to stop abruptly, the toy controller 120 will actuate the saddle vibrator motor 142 to vibrate the saddle 54, actuate the head speaker 136 to emit a loud neighing sound, flash the mane lights 128, actuate the body speaker 140 to emit a clip-clop sound corresponding to a rapidly-decelerating horse, actuate the head motor 150 to rotate the head 154 backwardly, and actuate the smoke generator 146 to emit a rapid succession of smoke puffs from the nostrils 148. In a preferred embodiment, the toy controller 120 is further configured to actuate aural, visual and other effects corresponding to movements, including consideration of direction and acceleration, such as actuating the mouth speaker 136 to emit a whinny and the saddle motor 142 to vibrate the saddle 54. It is to be understood that other effects, and various configurations of effects, can be employed. Also, in embodiments having other themes (such as a unicorn, elephant, Pegasus, car, spacecraft or the like), different effects consistent with the theme and correlating to various movement conditions can be employed.

With continued reference to FIG. 7, in a preferred embodiment, the toy controller 120 comprises wireless communications structure, such as an antenna and transceiver, configured to communicate wirelessly with a remote computing device 160, such as a remote control, smartphone, tablet or laptop computer. The remote computing device can communicate with the toy controller 120 via such wireless communication. In some embodiments the remote device 160 can access the memory of the controller 120 and modify the programming of the toy controller 120.

The toy controller also preferably can communicate instructions to the scooter controller 100—via the wired connection—to change how the scooter 30 responds to user inputs. For example, in one embodiment, a user of a smartphone may have an app enabling the user to select between a beginner mode, an intermediate mode and an advanced mode. When signaled by the smartphone to operate in the beginner mode, the toy controller 120 may be configured to operate in a manner more suited to very-young children. For example, vibration of the saddle 54 may be minimized, and sounds may be more whimsical that realistic in order to appeal to very-young children. The sounds may even include songs, and the thematic toy may speak, laugh or the like rather than simulate animal movements. Also, in the beginner mode, the toy controller 120 will direct the scooter controller 100 to change its response to user inputs. For example, the scooter reaction speed to user foot movements may be muted and intentionally slowed, and operating speeds may be cut in half, by two-thirds, or the like to enable safe usage by a very young child. Further, certain movements, such as reverse or spinning, may be eliminated and/or slowed to quarter speed.

In the intermediate mode, sounds and reactions may be more realistic, but speeds and reaction times may still be limited. The advanced mode can expect full speed and the most advanced and realistic effects. In another embodiment, the app can have a quiet mode, including a mechanism for reducing the volume of or muting aural effects, and may include the option of turning certain effects on or off. In some embodiments, the toy controller can communicate status or alerts to the remote device. For example, the toy controller can signal the remote device when the smoke generator device needs to be refilled with smoke fluid. In still further embodiments the riding toy 50 can include further sensors, such as proximity sensors, that communicate proximity of external objects to the toy controller 120. In such an embodiment, when the toy controller 120 is made aware of an object very close to the toy 50, it will communicate instructions to the scooter controller 100 to limit certain operations. For example, the toy controller 120 may instruct the scooter controller 100 not to induce a spin—regardless of the user input—in order to avoid impacting the sensed object. Such an embodiment could include an "inside" mode actuating this feature, and an "outside" mode when the proximity sensor feature is disabled.

In still further embodiments, user profiles can be created having preferred settings for particular users. For example, a first member of the family will always operate in beginner mode, while a second member of the family operates in advanced mode, but prefers to set all backward movements to half-speed and turn off the vibrating motors. Selection of a particular user's profile will result in the user adopting the operating preferences of the selected profile. In some embodiments, the user profiles can be saved in memory of the toy controller 120. In other embodiments, the user profiles can be saved in an online app, and accessed via the remote device 160 when initiating control of the riding toy 50.

In still further embodiments, the remote computing device 160 can operate as a remote control. As such, the toy controller 120 will receive input instructions from the remote device 160 and direct the scooter controller 100 how to control the scooter 30 regardless of any user foot inputs. Instead, the remote control 160 will instruct the toy controller 120 how to move, and the toy controller 120 will convey such movement instructions to the scooter controller 100, which will control the wheel motors 52 to apply such control instructions.

Figure 12:
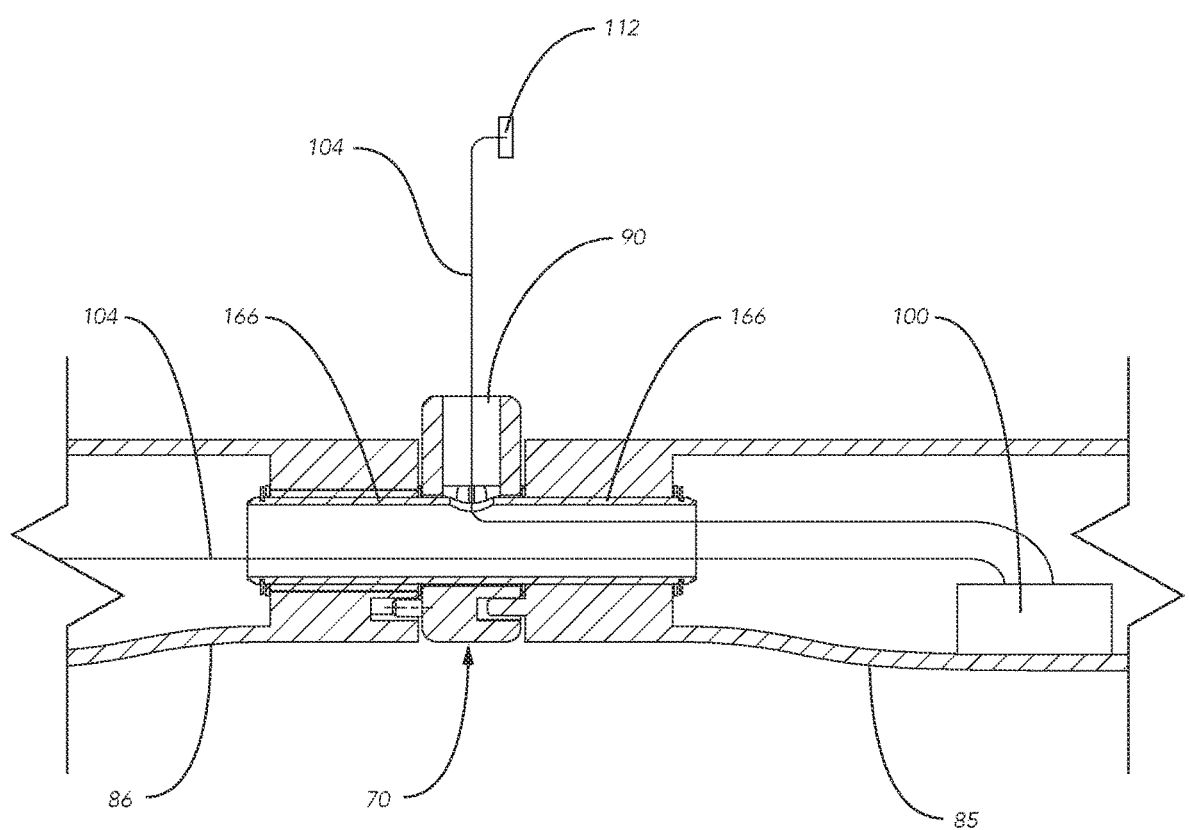
FIG. 12 is a close-up cross-sectional view of portions of another embodiment of a an insert placed between left and right parts of a self-balancing scooter.

With reference next to FIG. 12, another embodiment of an insert 70 is shown. In this embodiment, the insert 70 is unitarily formed and comprises left and right hollow axle portions 164 (rather than a separately-formed axle). Control wires 166 run through the hollow axle portions and post receiver 90 to connect the toy controller 120 with the scooter controller 100. In the illustrated embodiment, a free-hanging wire connector 168 is provided to connect to wires extending from the toy controller 120. In another embodiment, the toy controller 120 and scooter controller 100 can be configured to wirelessly share data back and forth. In such an embodiment, preferably the riding toy 50 also includes its own battery.

In preferred embodiments, the mount post 80 is releasably attachable in the insert post receiver 90 and/or the riding toy mount structure 83. Electronic connectors may be configured to engage in the toy mount structure, as shown in FIG. 7, or within the insert's post receiver if desired. In some embodiments, a user can obtain a second themed riding toy structure (sans scooter), can detach the original riding toy 50 from the scooter 30 and engage the second riding toy to the scooter, including electrically connecting the second riding toy. Thus, the scooter provides the movement and power interchangeably with a plurality of different riding toys, each of which will have its own customized set of thematic effects.

In further embodiments, structure such as a shock absorber can be incorporated into the mount post and/or the back legs so as to smooth out the ride. Further, the mount post and/or legs can have a telescoping structure that is powered by a motor so as to impart an up/down motion to the riding toy. Such up/down motion can be configured to change in frequency with speed, and can be configured to change in amplitude based upon personalized settings and mode, and or in connection with the detected motion.

In the embodiment illustrated in FIGS. 8-11, the mount post has a circular cross-section. It is to be understood that, in other embodiments, a mount post can have other cross-sectional shapes, such as square, hexagonal, or the like. Such shapes may facilitate communication of rotational movement from the scooter to the riding toy. In additional embodiments other structure, such as keyed structures, may engage the mount structure and/or post receiver so as to prevent the mount post from rotating relative to such mount structures. In yet additional embodiments, the insert can be configured to rigidly connect to the front legs of the riding toy frame rather than employing a mount post running between the scooter and the riding toy body.

With reference next to FIG. 13-16, another embodiment is presented in which the mount post 80 is rigidly and permanently attached to the frame 60, and specifically the support plate 82. In the illustrated embodiment, the mount post 80 has a non-circular cross-section. More specifically, the mount post is generally oval or elliptical in cross-section, and increases in both major axis and minor axis from its bottom end (where it engages the insert 70) to its top end (where it is attached to the support plate 82. A post interface 170 is defined at the bottom end and is configured to be received into a complementarily-formed post receiver 90 of the insert 70. As such, when the mount post 80 is seated in the post receiver 90 of the insert 70, due to its elliptical shape, the mount post 80 efficiently and effectively transfers rotation of the scooter 30 to the riding toy 50 with very little play. In the illustrated embodiment, a pair of fasteners 172 are also provided to connect the mount post 80 vertically to the insert 70.

In the illustrated embodiment, the head 154 of the riding toy 50 comprises a head post 174 configured to be received by a head receiver 176 supported by the frame 60. The head post 174 can be secured in place in the head receiver 176 via a fastener 178. Additionally, in the illustrated embodiment the non-load-bearing front legs 56 are each supported by a rotatable connector 180 comprising a spring-loaded detent 182. In practice, the legs 56 can each be rotated about a vertical axis from a storage position (opposite the shown position) to the extended position, which is shown. When the front legs 56 are in the desired, extended position, the spring-loaded detent 182 will actuate, keeping the front legs 56 in the extended position. Preferably the spring-loaded detent 182 will also actuate to releasably keep the front legs 56 in the storage position. In this manner, the present riding toy 50 can be partially disassembled and compacted for easier storage and shipping.

Figure 13:
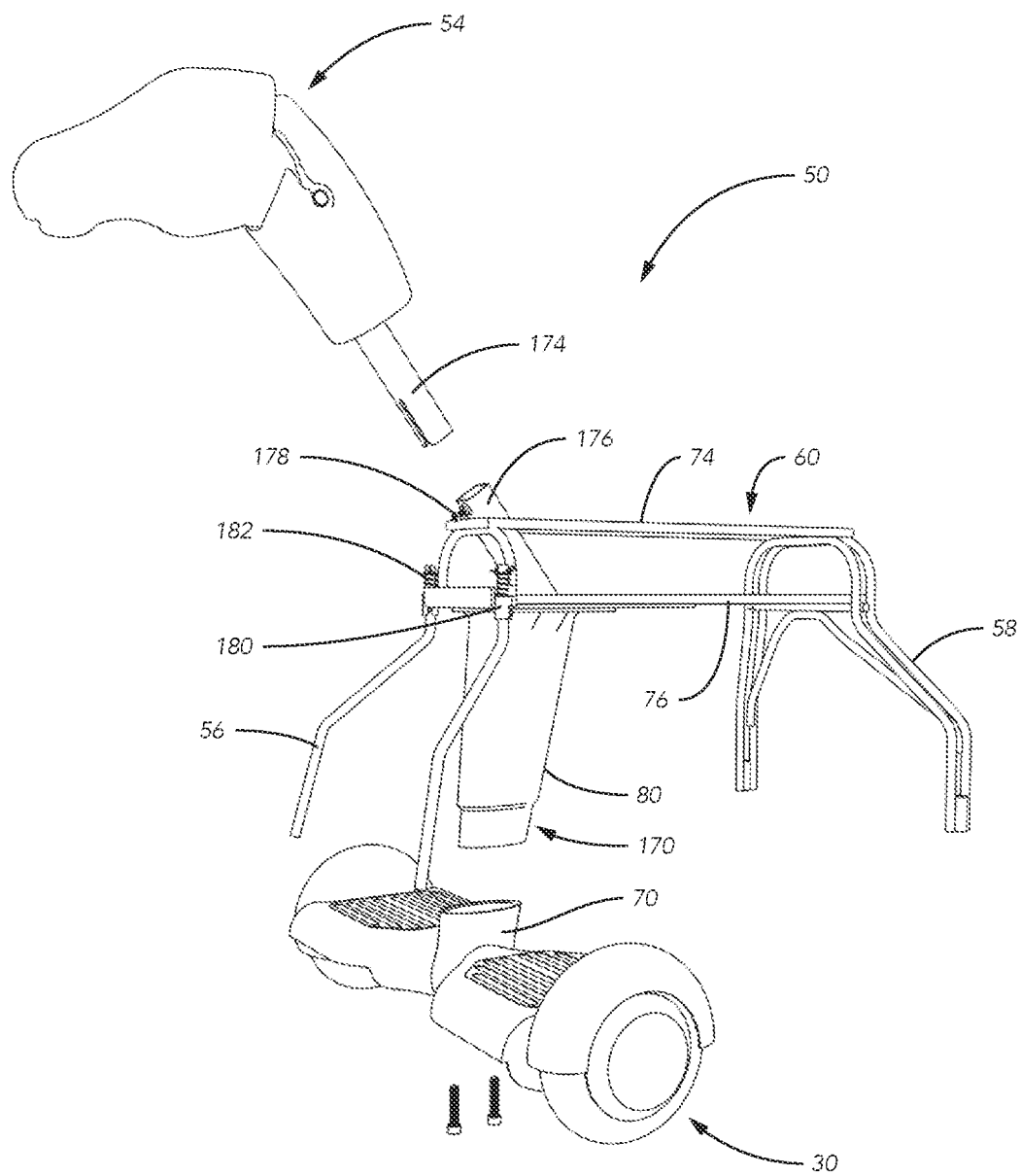
FIG. 13 is a perspective view of another embodiment of a powered thematic toy, showing the frame selectively attachable to a self-balancing scooter.
Figure 14:
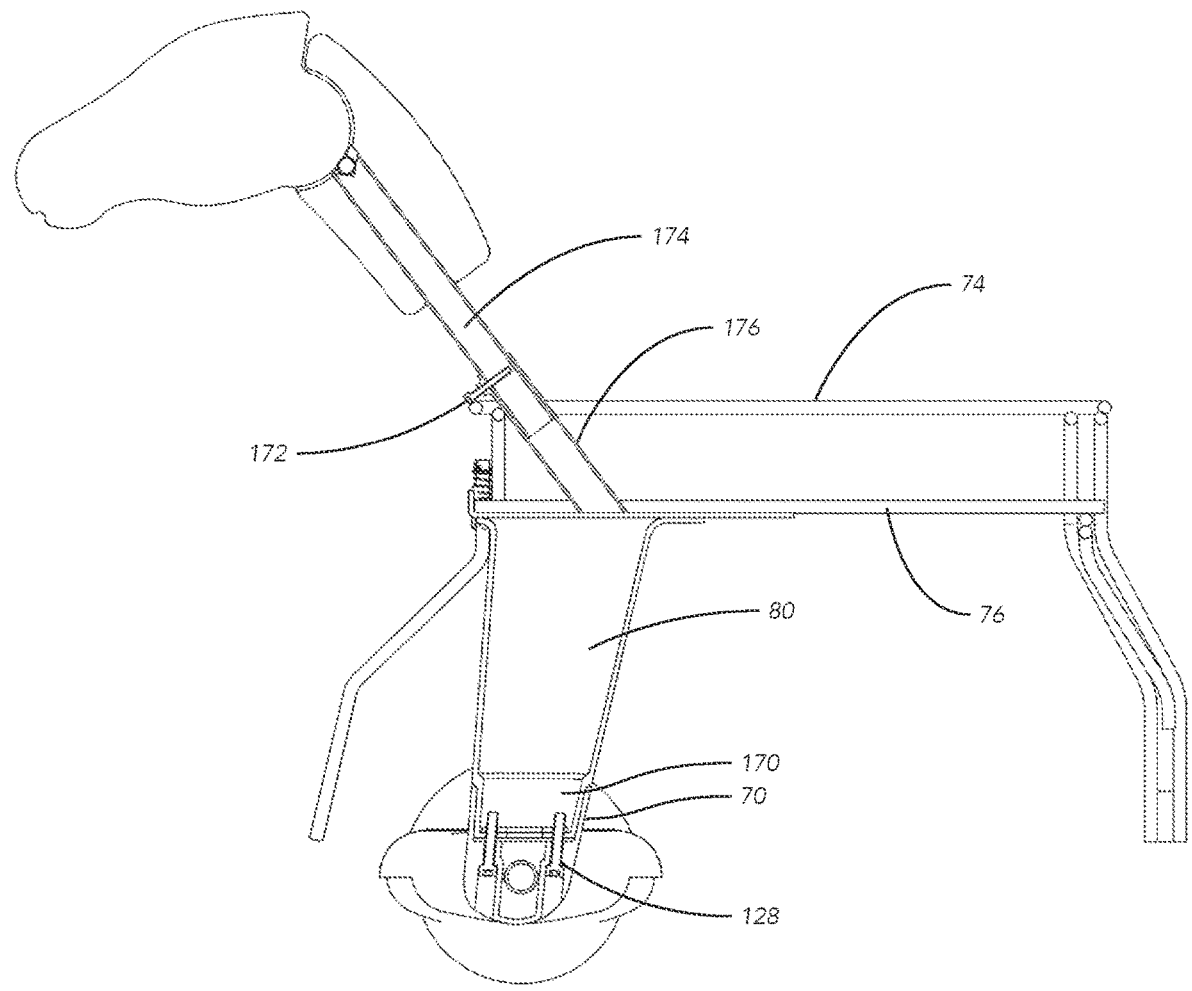
FIG. 14 is a cross-sectional view taken along line 14-14 of FIG. 13.

FIGS. 13 and 14 show the frame 60 of the riding toy 50 without the covering of thematic features. It is to be understood that such a basic frame 60 can accommodate multiple variations of thematic covers, including the horse theme, and can also accommodate a variety of visual, aural and tactile effects appropriate to the chosen theme. For example, rather than affix a head to the head receiver 176, a toy laser gun can be affixed to a head post 174, and the frame 60 covered with thematic accoutrements consistent with a spaceship. Visual, aural and tactile effects may be included that are specifically germane to a space flight/space battle game, including rocket engine noise, laser shooting sounds and light effects, and even tactile vibrations due to the ship being hit by other lasers and or simulated meteor impacts, along with radio transmissions from teammates.

Figure 15:
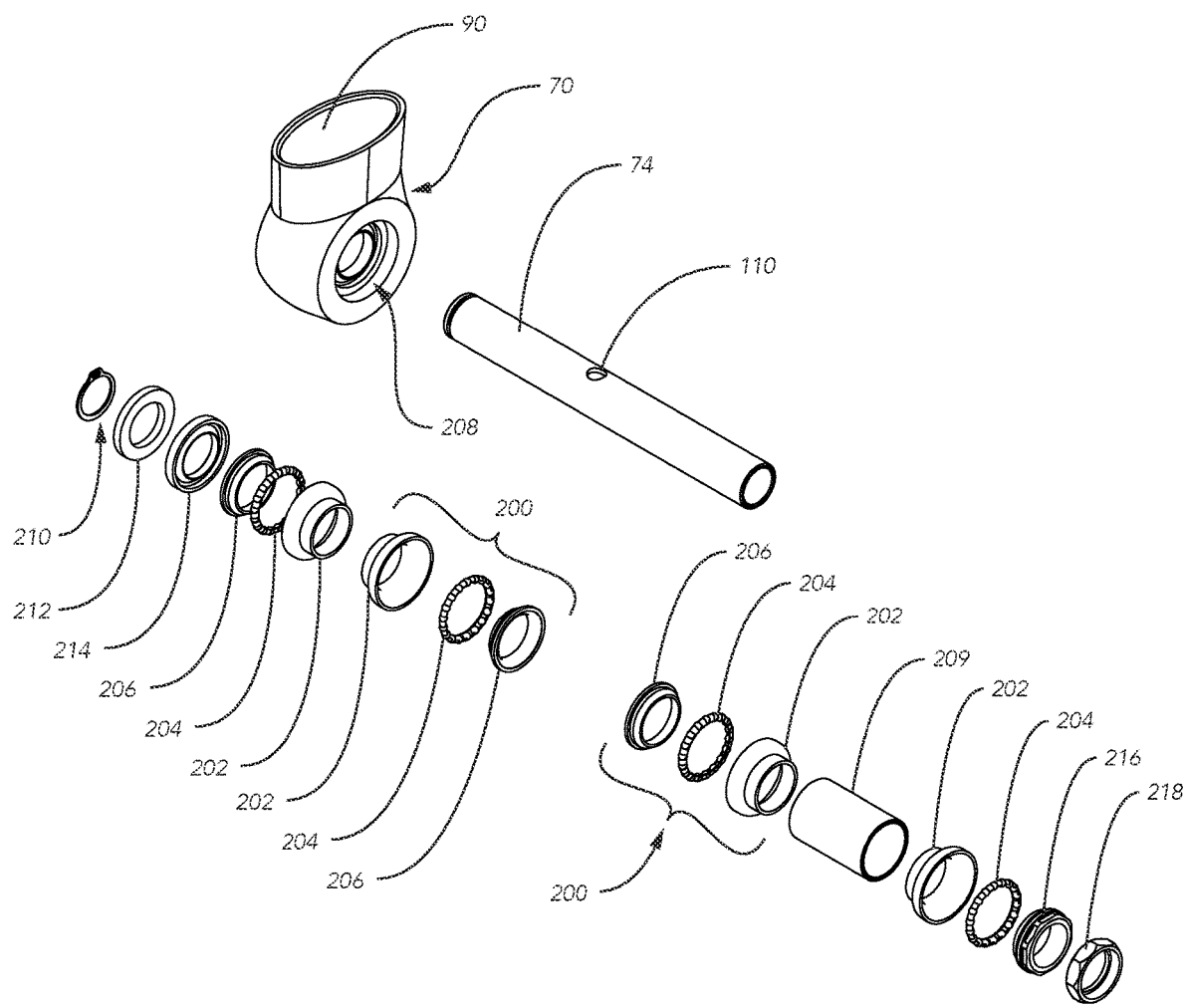
FIG. 15 is an exploded perspective view of an axle assembly of an embodiment of a self-balancing scooter.
Figures 16A, 16B:
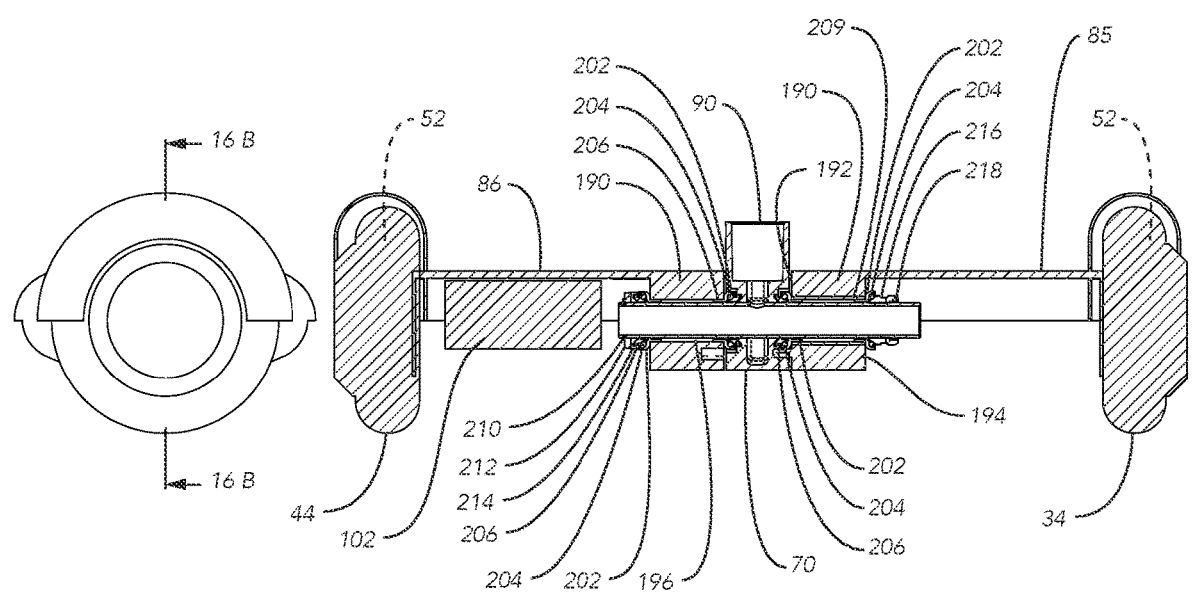
FIG. 16A is an end view of a scooter having the axle assembly of FIG. 15.
FIG. 16B is a cross-sectional view taken along line 16B-16B of FIG. 16A.

With specific reference next to FIGS. 15 and 16A-B, the illustrated embodiment comprises a bearing-supported interface between the insert 70, axle 72 and right and left chassis parts 85, 86. Specifically, each of the right and left chassis parts 85, 86 comprises a mount block 190 having an insert-side wall 192 and a wheel-side wall 194, and an axle passage 196 extending therethrough. The axle 72 extends through the axle passage 196 and the axle receiver 88 of the insert 70. A plurality of bearing assemblies 200, each comprising a bearing cup 202, bearing kit 204 and bearing race 206, are provided, one at each of the insert-side walls 192 and wheel-side walls 194, so as to rotatably support the axle 72 relative to the mount blocks 190. The bearing assemblies 200 on the insert-side walls 192 are also received into a bearing seat 208 formed in the insert 70, and are configured to provide a limited clearance space between the insert 70 and adjacent insert-side walls 192 of the mount blocks 190. A spacer 209 can be provided over the axle and between bearing assemblies 200.

The bearing-supported interface preferably is configured to have very little to no play. To that end, one end of the axle 72 includes a retaining ring 210, washer 212, and race stopper 214, and at the opposite end of the axle 72 a threaded bearing race 216 replaces race 206, and a lock nut 218 secures the entire interface together. Since the bearing-supported interface has very little to no play, rotation about an axis transverse to the axle 72, such as spinning of the scooter is more readily and predictably transferred to the mount post 80 and riding toy 50.

In another embodiment, rather than employing a retaining ring, washer and race stopper, the first end of the axle can be provided with a raised flange for retaining bearing assemblies.

Figure 17:
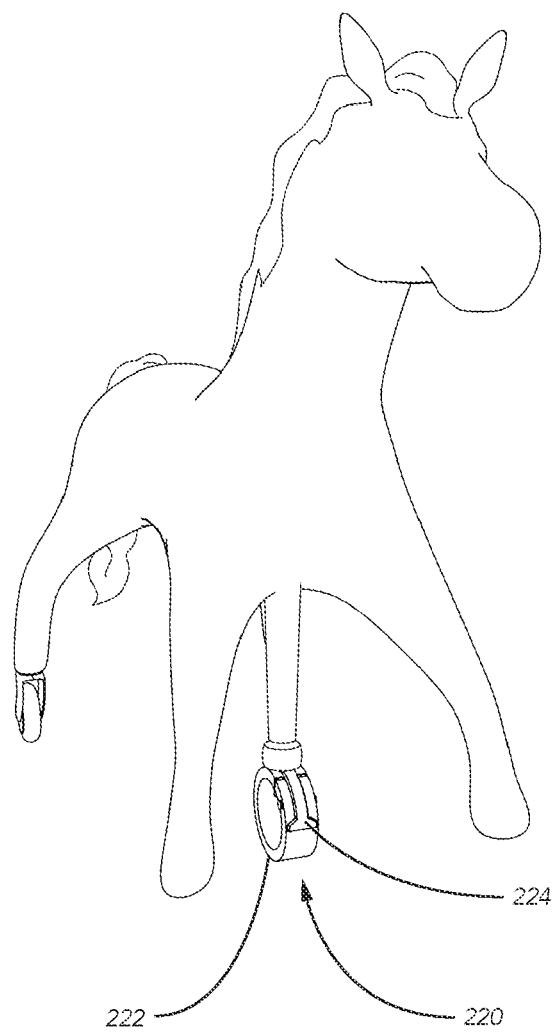
FIG. 17 is a perspective view of another embodiment of a wheeled riding toy having a clamp.
Figure 18:
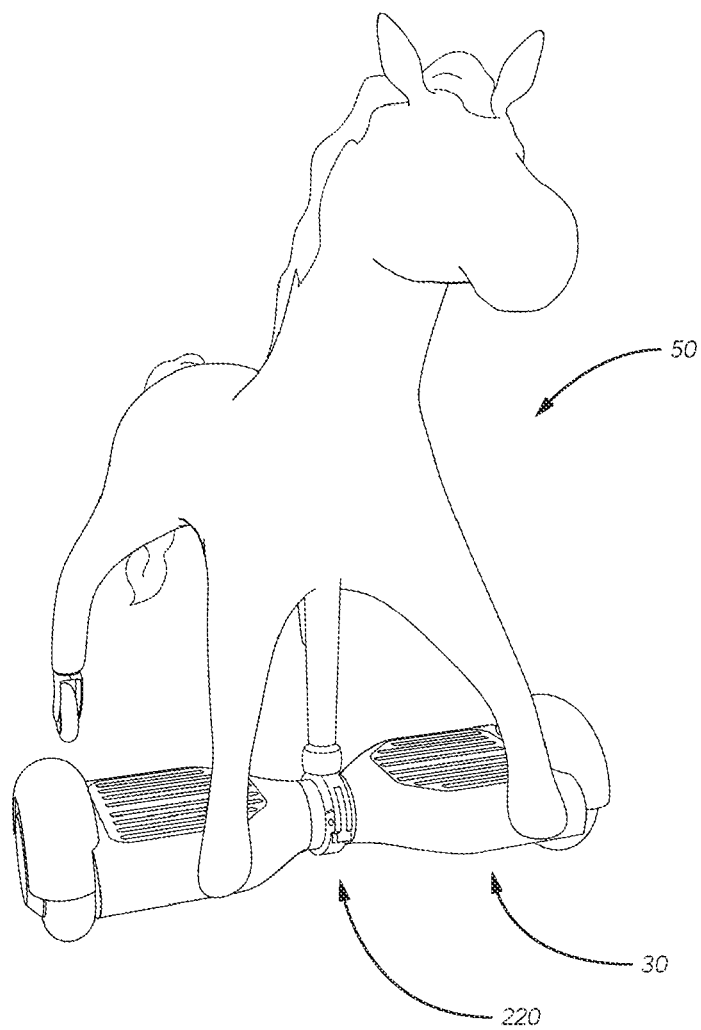
FIG. 18 shows the toy of FIG. 17 clamped onto a self-balancing scooter.

The embodiments discussed herein have generally provided a riding toy 50 attached to a scooter 30 via an insert 70. In additional embodiments, different structures can be employed to attach the riding toy 50 to a scooter 30. For example, with reference next to FIGS. 17 and 18, an embodiment of a riding toy 50 may include a clamp 220 defining a collar 222 configured to openable and closeable by mans of a lever 224. In use, the collar 222 can be opened and drawn around the central part of a typical scooter 30, and the lever 224 can then be actuated to close the collar 222 and tighten it, to an extent, about the center of the scooter 30. The scooter 30 then is attached to the riding toy 50, and the riding toy 50 will move with the scooter 30 in a manner similar to embodiments discussed above.

The embodiments discussed above have employed a scooter in which the left and right parts rotate relative to one another. It is to be understood that principles discussed herein can be applied to other configurations of two-wheeled self-balancing scooters, such as configurations in with the left and right parts do not rotate relative to one another.

Figures 19A, 19B:
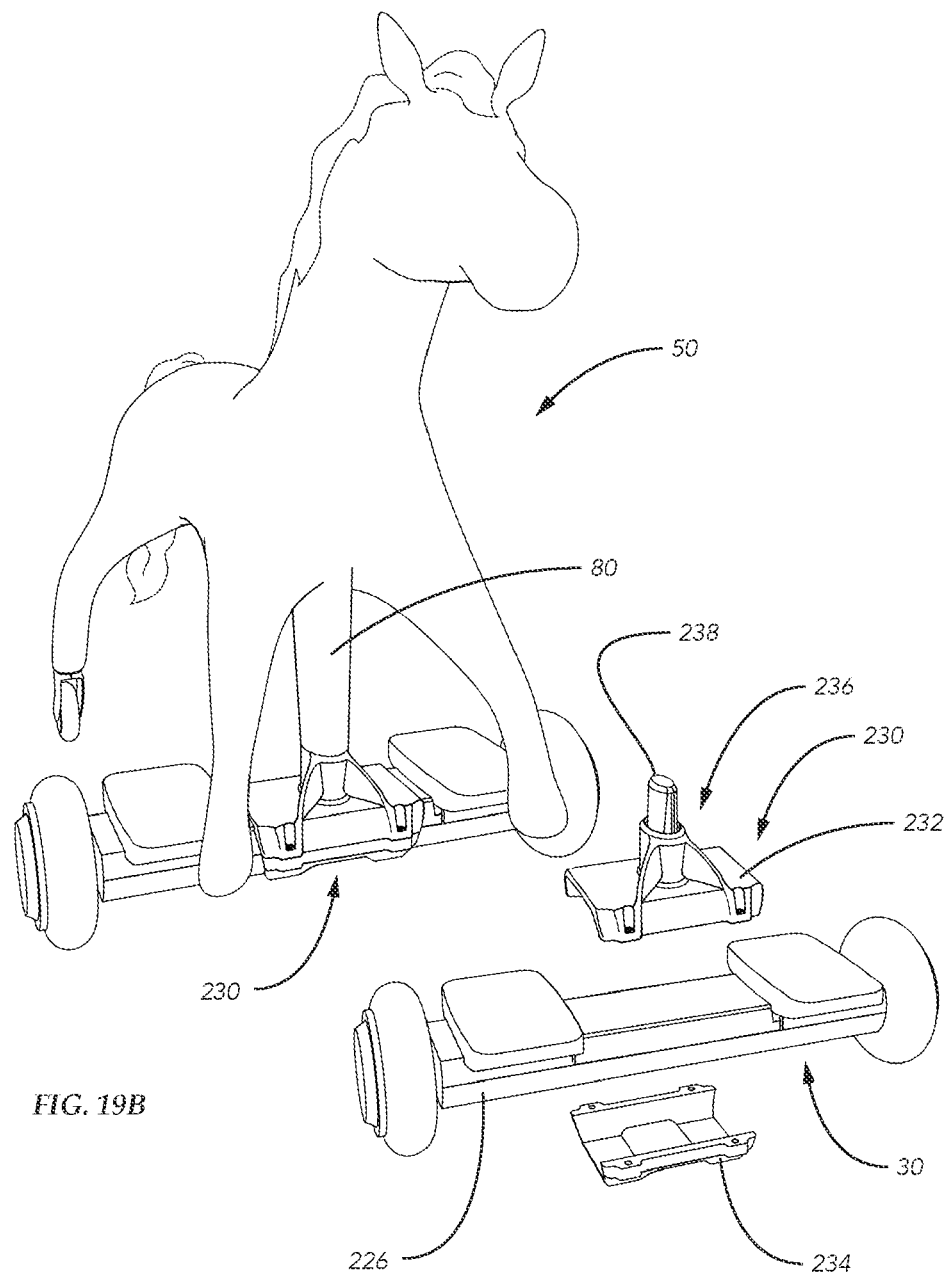
FIG. 19A shows a perspective view of another embodiment of an attachment device configured for use with another embodiment of a self-balancing scooter.
FIG. 19B shows a wheeled riding toy attached to the configuration of FIG. 19A.

With reference next to FIGS. 19A-B, an embodiment of a self-balancing scooter is shown in which a body 226 of the scooter is unitary. As such, although sensors in the right and left footpads 36, 46 detect user inputs to communicate to the scooter controller, the body 226 is not separated into right and left parts that rotate relative to one another. In the illustrated embodiment, an attachment member 230 comprises a top part 232 and a bottom part 234 configured to enclose a portion of the body 226 of the scooter 30. The top and bottom parts 232, 234 preferably are fastened to one another, sandwiching the body 226 therebetween. The top part 232 includes an interface 236 comprising a male interface member 238 configured to be received by a female receiver (not shown) in an embodiment of a mount post 80 of a riding toy 50. As such, the riding toy 50 can be selectively attached to, and work with, multiple types of scooters 30.

Figure 20:
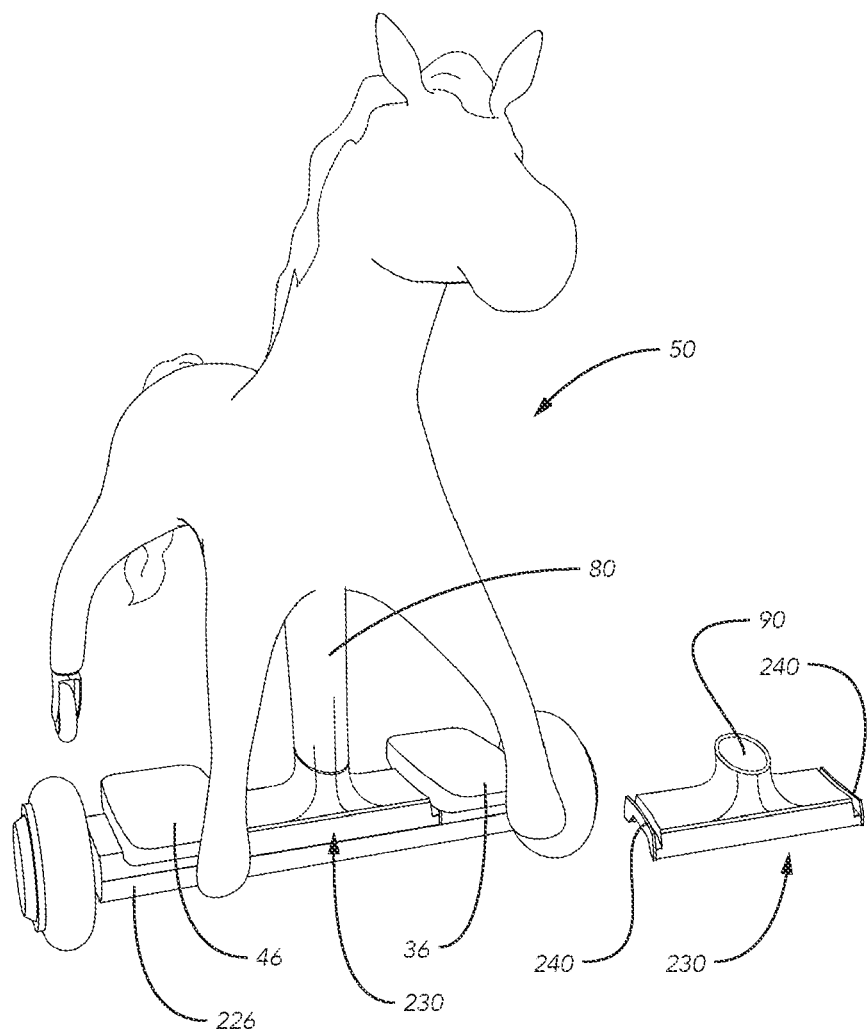
FIG. 20 shows a perspective view of a wheeled riding toy attached to a self-balancing scooter via yet another embodiment of an attachment device.

FIG. 20 shows another embodiment, in which an attachment member 230 is configured to bolt directly onto a scooter body 226 and comprises a post receiver 90 configured to receive the mount post 80 of the riding toy 50. As an alternative to bolting, the illustrated attachment member 230 includes tabs 240 configured to fit under the right and left footpads 36, 46, so that the footpads keep the attachment member 230 in place on the scooter body 226.

Figure 21:
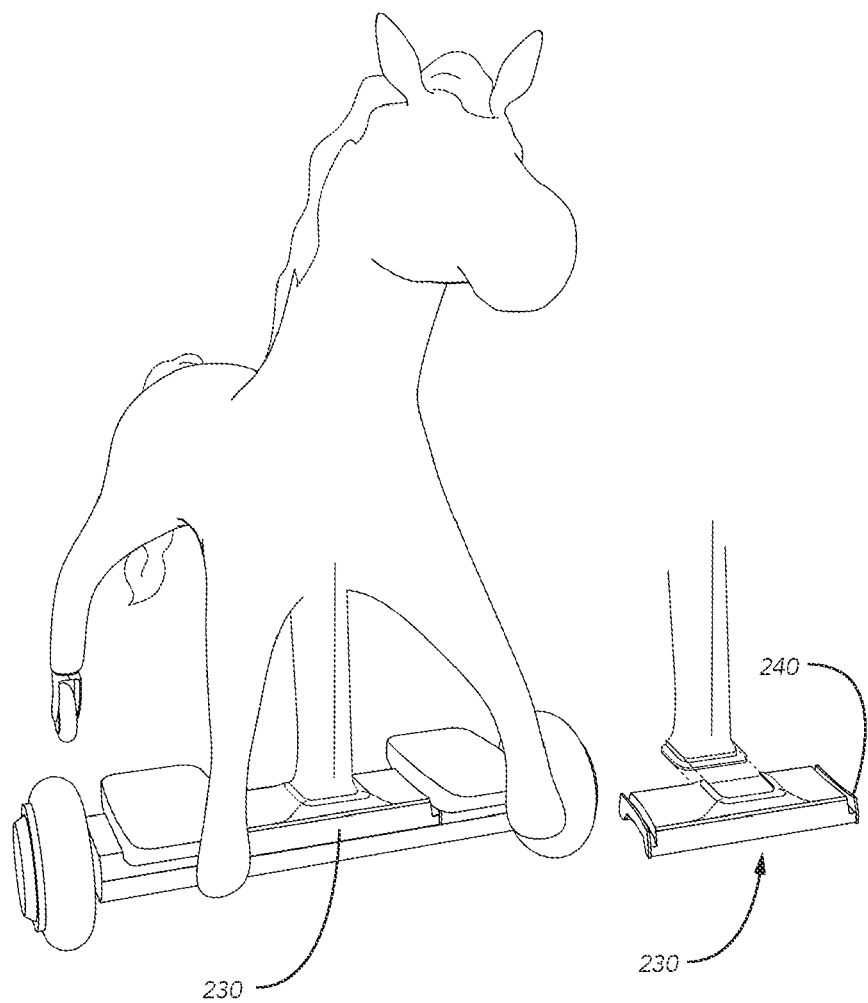
FIG. 21 shows a perspective view of still another embodiment of an attachment device, and a wheeled riding toy attached to a self-balancing scooter via the attachment device.

With reference next to FIG. 21, another embodiment of an attachment member 230 having tabs 240 comprises an interface 236 having a sliding receiver 242. The mount post 80 of the riding toy 50 includes a flange 244 about its bottom end, which flange 244 is configured to be received in the sliding receiver 242 in order to securely secure the riding toy 50 to the scooter 30.

It is to be understood that additional embodiments may employ still further structure to secure the riding toy to a scooter, whether via an insert 70 or attachment member 230. And, for example, interfaces 236 for connecting a mount post 80 can take various specific structural shapes, whether being employed with an attachment member 230 as shown, or in embodiments employing an insert 70.

Figure 22:
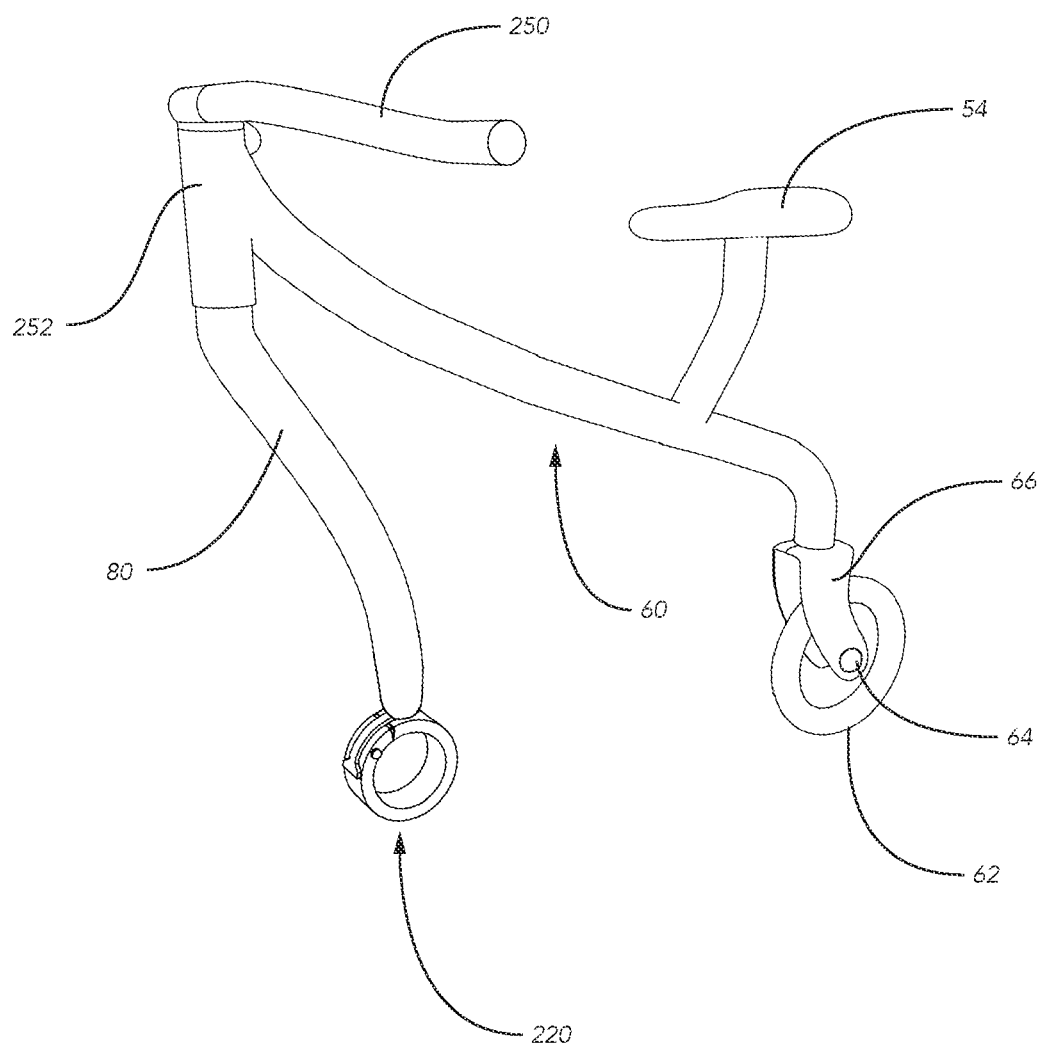
FIG. 22 is a perspective view of another embodiment of a wheeled riding toy having a clamp.
Figure 23:
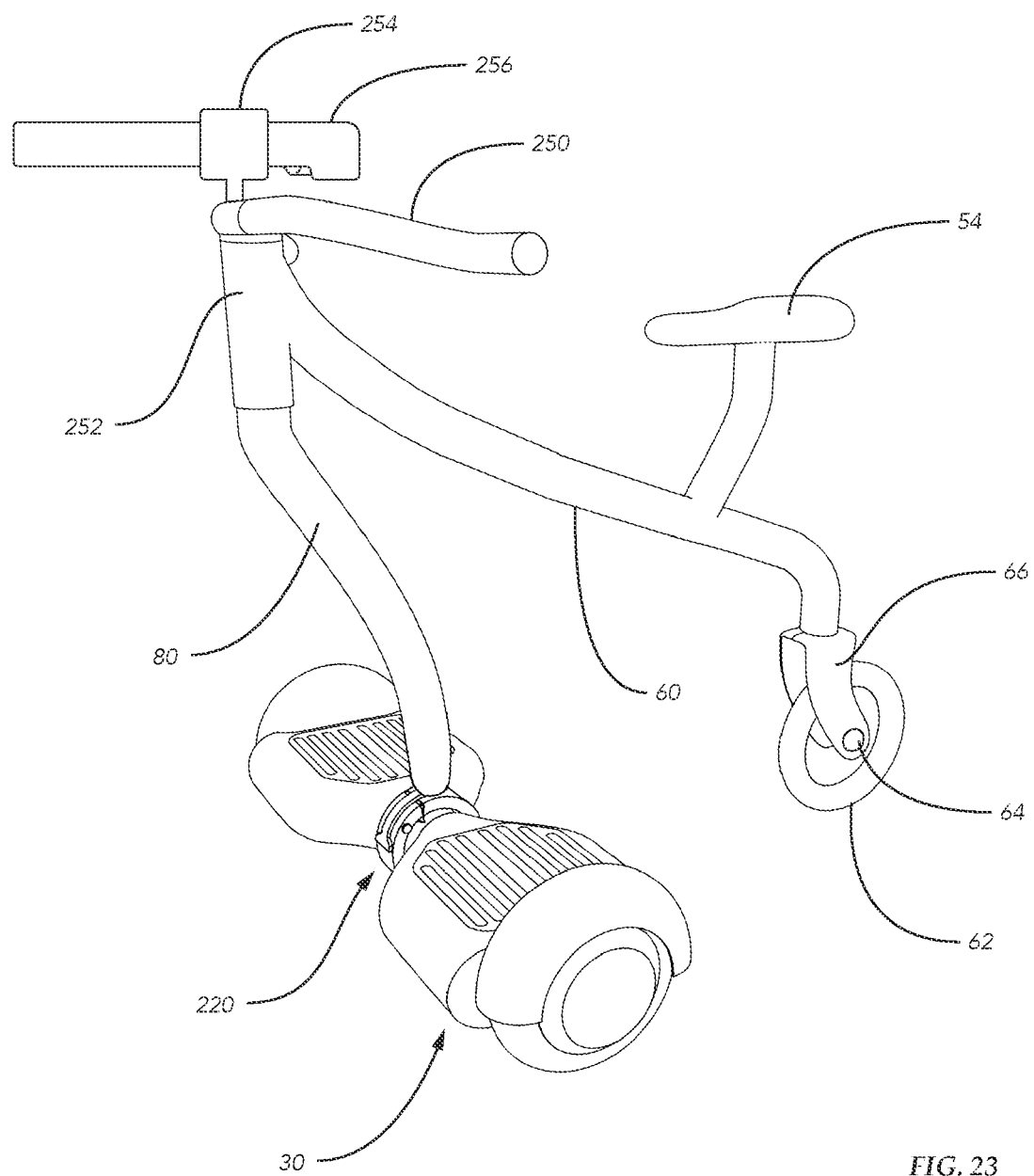
FIG. 23 is a perspective view of the configuration of FIG. 22 attached to a self-balancing scooter and having a mounting accessory.

With reference next to FIGS. 22 and 23, another embodiment of a riding toy 50 comprises a frame 60 attachable to a scooter 30 via a mount post 80. The illustrated frame 60 is supported by a single wheel mount 66 and wheel 62, and the wheel mount 66 is configured to enable free rotation about a vertical axis. The illustrated wheel 62 is relatively large, such as having a diameter as large as or greater than a diameter of the wheels 34, 44 of the scooter 30. In a preferred embodiment, the wheel 62 includes an inflatable tire configured to support the weight of larger children, teenage boys and the like. A saddle 54 is supported by the frame 60. In the illustrated embodiment the saddle 54 resembles a typical bicycle seat.

A handlebar 250 is supported by a neck 252, which attaches to both the mount post and frame 60. The handlebar 250 serves no steering function, and preferably simply provides a place for a rider seated upon the saddle 54 to hang onto while riding. In a preferred embodiment, the neck 252 provides a rigid connection to both the mount post 80 and frame 60 so that, in essence, the frame 60, neck 252 and mount post 80 effectively function as a unitary frame member. In this manner, and as in embodiments discussed above, the riding toy 50, though shaped differently than riding toy embodiments discussed above, moves with the scooter 30.

With continued reference to FIGS. 22 and 23, the illustrated embodiment does not include a thematic element. Such an embodiment my be preferable for older children, teens and adults who may enjoy the movement of the riding toy 50 without wanting the thematic elements. Also, it is to be understood that accessories can be added. For example, as depicted in FIG. 23, a mount 254 may be provided on the handlebar 250. The mount 254 may have many configurations. In the illustrated embodiment, the mount 254 is configured to hold a toy gun, such as a water rifle or Nerf® dart gun. Groups of riders can employ their riding toys in game battles resembling airplane dogfights.

In additional embodiments, the handlebar 250 can be configured to rotate about the axis of the neck 252, such as to accommodate user comfort or to provide a range of motion for, for example, aiming a play gun 256 secured in the mount 254. In a preferred embodiment, the range of handlebar 250 rotation is limited, such as to 90° or 60° total rotation (i.e., 45° or 30° in each rotational direction).

In still further embodiments, the frame 60 can also rotate about the axis of the neck 252. However, excessive rotation of the frame 60 about the neck 252 may make the riding toy 50 unstable. Thus, in additional embodiments, such rotation is limited to a range such as to 90° or total rotation (i.e., 45° or 30° in each rotational direction).

Figure 24:
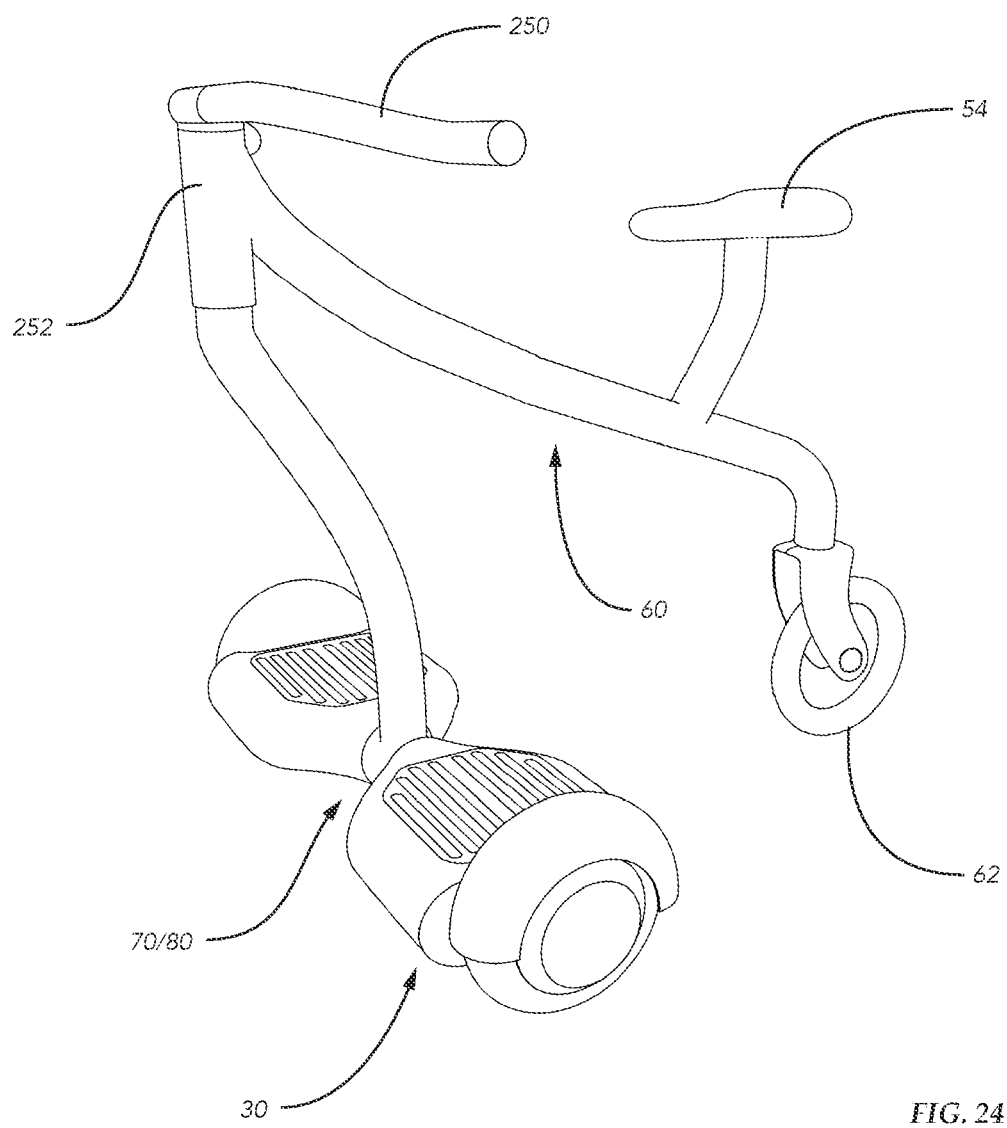
FIG. 24 is a perspective view of another embodiment of a wheeled riding toy attached to a self-balancing scooter.

In the embodiments illustrated in FIGS. 22 and 23, the riding toy 50 is attached to the scooter 30 via a clamp 22. It is to be understood that, in additional embodiments, several other types of attachment mechanisms, as discussed in other embodiments, may be employed. With reference next to FIG. 24, another embodiment is illustrated in which the frame 50 is permanently attached to the scooter 30. In this embodiment, the mount post 80 and insert 70 are one unitary member.

An age-old and simple thematic toy is a "pony stick", which basically comprises a broomstick with a thematic feature—such as a horse's head—at one end. A child can pretend to ride a horse by holding the stick between his legs while skipping along—preferably while wearing a cowboy hat.

Figure 25:
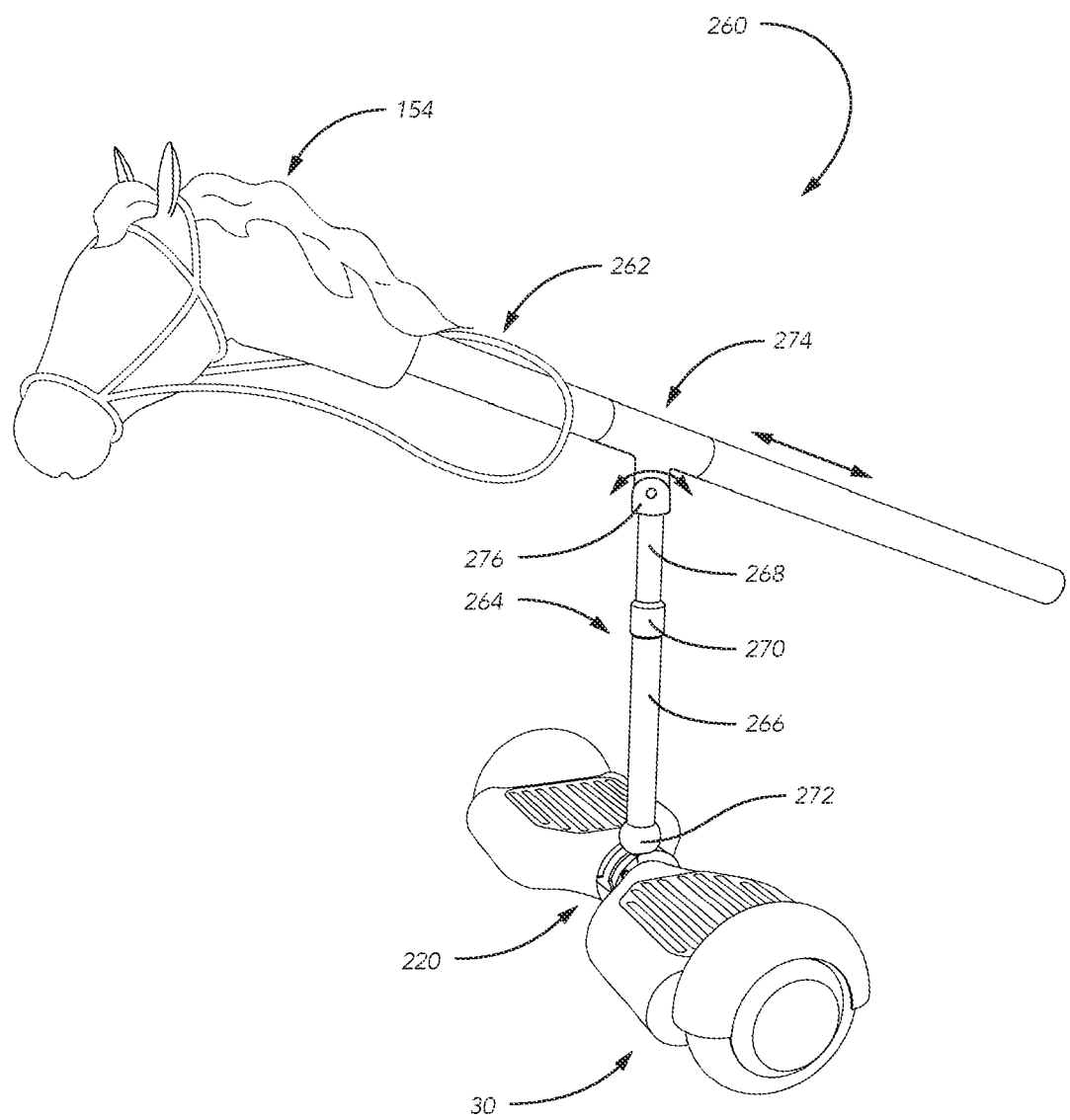
FIG. 25 is a perspective view a thematic accessory attached to a self-balancing scooter.

With reference to FIG. 25, an embodiment is presented of a thematic toy structure 260 that can be removably attached to a self-balancing scooter 30. The illustrated thematic structure 260 includes a pony stick 262 having a horse's head 154. In the illustrated embodiment, a clamp 220 is configured to fit around and clamp onto such the scooter 30 at the joint between the right and left parts 32, 42.

A post 264 extends upwardly from the clamp 220. In the illustrated embodiment, the post 264 comprises a main post member 266 and a secondary post member 268. The secondary post member 268 is slidably received partially within the main post member 266 in a telescoping configuration so as to adjust the length of the post 264. A telescope clamp 270 fixes the position of the secondary post 268 relative to the main post 266 so as to maintain the post 264 at a selected length. Preferably, the post 264 is connected to the clamp 220 by a ball joint 272 so as to give the post 264 a great range of motion and adjustment about the clamp 220 (and associated powered scooter 30).

Continuing with reference to FIG. 25, in the illustrated embodiment the pony stick 262 is attached to the top of the post 264 via a top clamp 274. In the illustrated embodiment the pony stick 262 is longitudinally slidable within the top clamp 274 to a desired position and selectively held in place in that position by the top clamp 274. The top clamp 274 is attached to the top end of the post 264, preferably at a hinged connector 276 configured so that the top clamp/pony stick can rotate about the hinged connector 276 in a vertical plane—i.e., in a plane parallel and/or including the post. This connection can also be configured so that the top clamp/pony stick can rotate in a horizontal plan—i.e., in a plane perpendicular to the post.

The configuration shown in FIG. 25 enables the thematic toy structure 260 to be attached to any scooter—such as by the illustrated clamp of any of the attachment structures discussed in other embodiments. Preferably, adjustments can be made to customize the structure 260 to the size of the rider. During use, the user rides the scooter 30 normally—in a standing orientation. The pony stick 262, however, is supported in an ideal location for the user to play as if riding a pony, and the user can even rotate the pony's head up and down to simulate a galloping horse. Further, the pony stick 262 will adjust to the forward and sideways leaning of the user's body incident to controlling the self-balancing scooter 30. Further, although the scooter 30 supports the weight of the thematic toy structure 260, the user still holds it in place when riding.

In at least some embodiments the thematic toy structure 260 can be both physically and electrically attached to the scooter 30 and can include electric-powered elements that can be powered by the scooter's batter. Of course, in other embodiments the structure 260 can have its own battery to power such elements, and can be only physically attached to the scooter 30. In one embodiment, the thematic structure 260 can include a button actuable by a user to trigger a sound effect. Other effects can be triggered by conditions, such as speed, direction, or the like, as also discussed in other embodiments. Such effects can include aural, visual, and/or tactile effects.

It is to be understood that the principles discussed herein can be employed with other specific structure and other thematic structures. For example, in another embodiment the thematic structure can simulate the shape of an airplane, space ship, car or the like rather than a pony stick. The specific structure of the post may be somewhat different, but the principle remains that the thematic structure is attachable to and supported by a powered self-balancing scooter while being held and used by the rider while standing and riding the scooter 30.

It is also to be understood that further embodiments may include still additional features. For example, some embodiments may include a toy gun structure—such as a Nerf® dart gun, squirt gun, laser-tag and/or other type of play gun. Additional embodiments may include mounts so that participants can add their own play gun structures to the thematic structure. A group of riders can then, for example, participate in a "dog fight" simulation or game.

Figure 26:
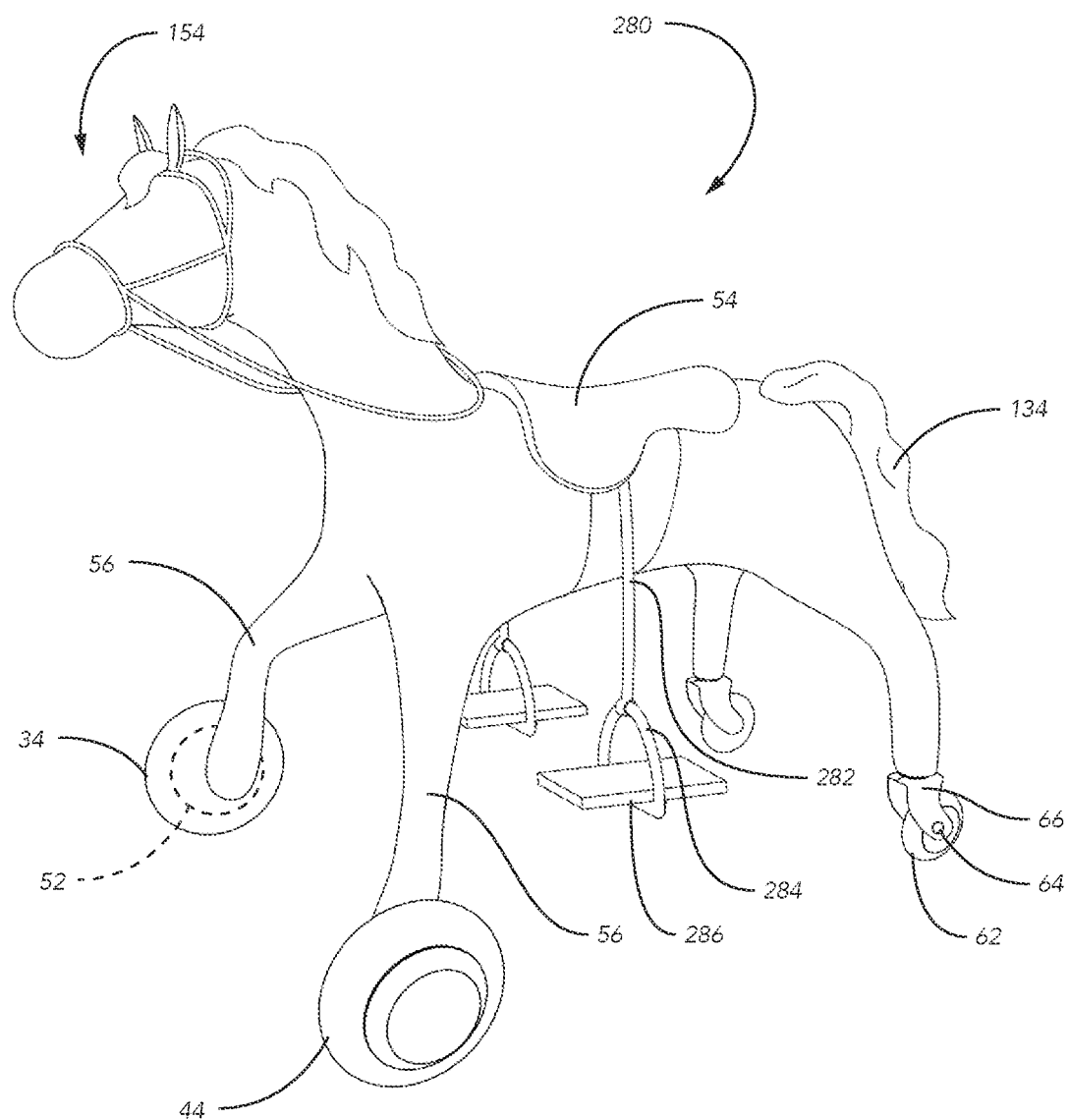
FIG. 26 is a perspective view of another embodiment of a powered wheeled riding device.
Figure 27:
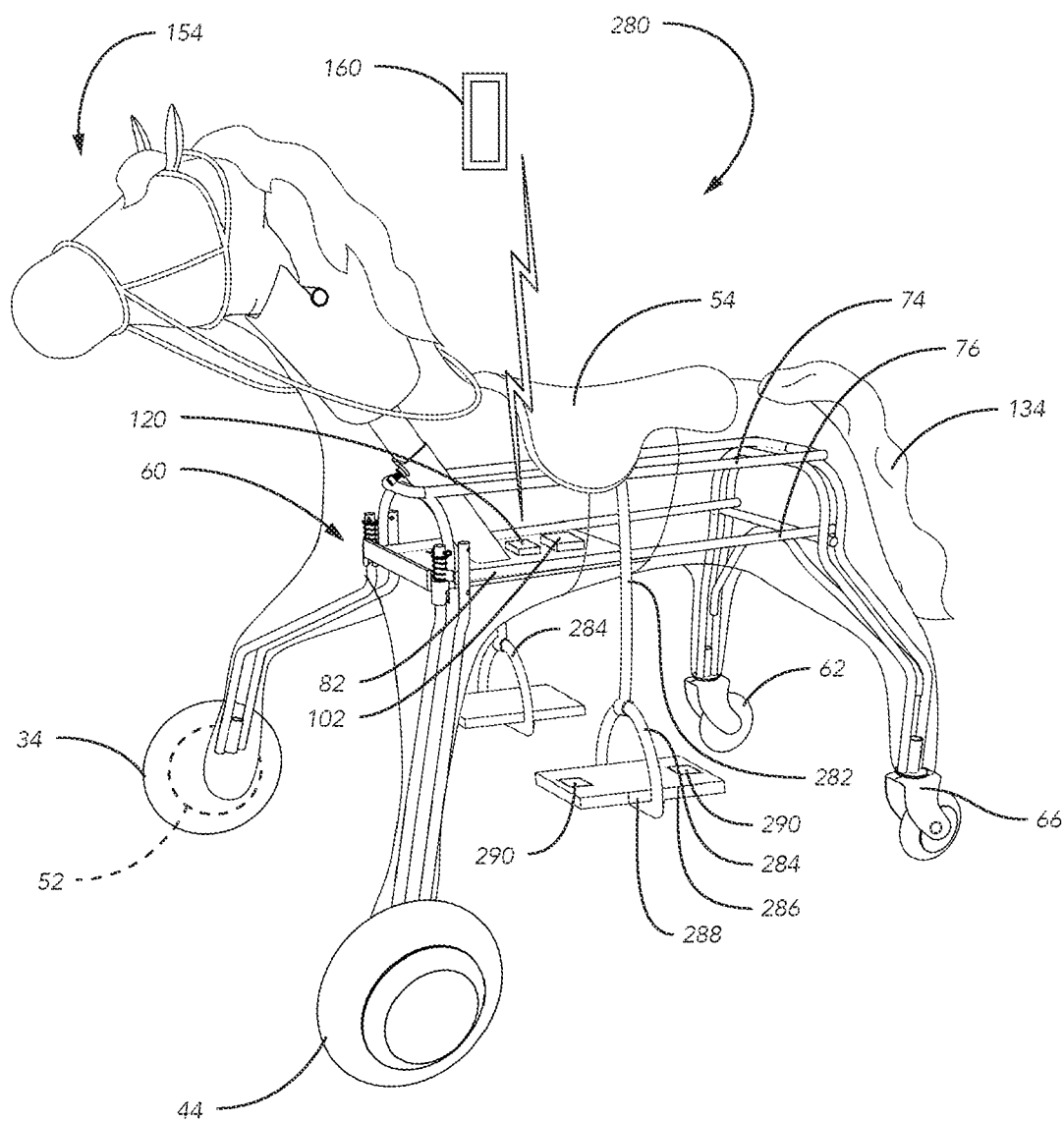
FIG. 27 shows the configuration of FIG. 26, showing internal structure.

With reference next to FIGS. 26 and 27, another embodiment of a powered thematic riding toy 280 is provided. In the illustrated embodiment the riding toy 280 is configured about the theme of a horse, and includes a head 54, mane 130, tail 134 and the like. The illustrated riding toy 280 can share similar components with some of the embodiments of riding toys 50 discussed herein. For example, the thematic elements of the riding toy 280 are supported by a frame 60 having upper members 74 and lower members 76, as well as a pair of rear legs 58 that attach to wheel mounts 66 configured to rotate freely about an axis of the rear legs 58, which preferably is about vertical. The wheel mounts 66 support horizontal axles 64, and wheels 62 rotate about the horizontal axles 64. The wheel mounts/wheels can be casters.

In the illustrated embodiment, a pair of front legs 56 connect to motors 52 that are mounted in the hubs of right and left wheels 34, 44. As such, the motors 52 are not substantially visible. Each motor is configured to drive the corresponding wheel 34, 44 forward or backward. Preferably each motor 52 is rigidly attached to the corresponding leg 56 so that the motor does not rotate in the same manner as the rear wheels 62. More specifically, there is no rotation of the motor/wheel combination about a vertical axis in a manner that would be considered steering of the wheels.

With continued reference to FIGS. 26 and 27. The frame 60 preferably supports a controller 100 and battery 102, which are connected to the motors 52 in order to control the motors. Depending on user inputs, the controller 100 directs the right and left wheels 34, 44 to move forwardly and rearwardly in order to direct movement of the riding toy 280 in a manner similar to the control strategy used with self-balancing scooters 30 as discussed above. In fact, from a movement perspective, the present embodiment of a riding toy 280 moves similarly to how riding toy 50 embodiments discussed above would move were the scooter 30 attached at the front legs 56.

A stirrup support 282 depends from the frame 60 on each side of the riding toy 280 generally aligned with the saddle 54. Stirrups 284 hang from the stirrup supports 282, and each stirrup 284 preferably includes a stirrup plate 286 configured to accept a user's foot resting thereon. Sensors 288 associated with the stirrup plate 286 measure user foot inputs and communicate such inputs to the controller 100. As such, user foot inputs can be employed to control the riding toy 280, including forward, backward, turning and spinning motions. Such control is dictated by the wheels 34, 44 at the front legs 56, and the rear wheels 62 simply support the riding toy 280 while providing no steering control. It is to be understood that various sensor configurations can be employed to obtain user foot inputs. For example, in one embodiment, stirrup plate sensors 288 measure a rotation angle of the stirrup plate 286 relative to the associated stirrup 284 as the user input. In additional embodiment in addition to or instead of such a rotational sensor, pressure sensors 290 can measure differences in user foot pressure between a front and back portion of the stirrup plate 286, and the controller 100 can determine a control strategy based on such measurements.

It is to be understood that the illustrated thematic powered riding toy 280 can employ several visual, aural and tactile effects, including example effects discussed in other embodiments, and the controller 100 can include wireless communication structure enabling monitoring, programming and even control by a remote computing device 160.

In additional embodiments, additional inputs may be considered by the controller 100 when controlling the motors 52. For example, in the illustrated embodiment the head 54 is hingedly connected to the head post 174 at hinge joint 152, and reins 292 are accessible to a rider, and connected to a nose of the head 154. A user pulling up on the reins 292 thus may rotate the head 154 upwardly—clockwise about the hinge joint 152 in the illustrated view, while a user pulling down on the reins 292 may rotate the head 154 downwardly—counterclockwise about the hinge joint 152 in the illustrated view. A joint sensor 294 can measure such rotation, and send data concerning same to the controller 100. For example, the user pulling the reins to rotate the head 154 downwardly signals a forward movement, while pulling back on the reins 292 to rotate the head 154 upwardly signals slowing/stopping, and even backward movement. In such a configuration, the reins 292 provide only forward/backward guidance, and do not steer. Instead, steering inputs are taken from the stirrups 286.

In some embodiments, forward/backward inputs can be taken from both reins 292 and stirrups 286, with rein 292 inputs trumping stirrups 286 inputs, but only with respect to forward/backward inputs. In other embodiments, stirrup inputs are the default input for all control, except that if a sharp pull back on the reins 292 is detected, an emergency stop control is triggered, and the riding toy 280 will immediately stop all motion. Of course, it is to be understood that additional control routines and sensor inputs can be employed. For example, in some embodiments sensors can be configured to detect directional (i.e., right and left) pulling upon the reins 292 so that steering control can also be based on rein inputs.

The embodiments discussed above have disclosed structures with substantial specificity. This has provided a good context for disclosing and discussing inventive subject matter. However, it is to be understood that other embodiments may employ different specific structural shapes and interactions.

Although inventive subject matter has been disclosed in the context of certain preferred or illustrated embodiments and examples, it will be understood by those skilled in the art that the inventive subject matter extends beyond the specifically disclosed embodiments to other alternative embodiments and/or uses of the invention and obvious modifications and equivalents thereof. In addition, while a number of variations of the disclosed embodiments have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. For example, as discussed above, any embodiment can be modified to connect to a scooter using any of the various attachment structures discussed herein, and embodiments as discussed in FIGS. 26 and 27 can employ many of the principles discussed in other embodiments, particularly in connection with visual, aural and tactile effects, as well as options regarding themes and additions of accessories. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed embodiments described above, but should be determined only by a fair reading of the claims that follow.

What is claimed is:

1. A powered wheeled riding device, comprising:
   a first chassis part supporting a first footpad and a first wheel, the first wheel configured to rotate about a chassis axis, the first chassis part terminating along the chassis axis at a first chassis part inner end disposed on a side of the first footpad opposite the first wheel;
   a second chassis part supporting a second footpad and a second wheel, the second wheel being configured to rotate about the chassis axis, the second chassis part terminating along the chassis axis at a second chassis part inner end disposed on a side of the second footpad opposite the second wheel; and
   an insert;
   a riding toy portion comprising an elongated frame structure supporting a saddle configured to support a rider thereupon, a mount post depending from the frame structure and attached to the insert, a back leg depending from the frame structure and having a wheel structure attached thereto and spaced from the frame structure;
   wherein the first chassis part, second chassis part and insert are coupled together with the insert sandwiched between the first chassis part inner end and the second chassis part inner end; and
   wherein the first chassis part, second chassis part and insert are each rotatable relative to one another about the chassis axis.

2. A riding device as in claim 1, additionally comprising an axle that is aligned with the chassis axis, wherein the axle supports the first chassis part, the second chassis part and the insert.

3. A riding device as in claim 2, wherein the first chassis part and the second chassis part are each supported by bearings on the axle, and the first chassis part and the second chassis part are each rotatable about the axle.

4. A riding device as in claim 2, wherein the axle is not rotatable relative to the insert, an axle aperture is formed in the axle, and a bottom aperture is formed in the insert, and wherein the axle aperture is aligned with the bottom aperture.

5. A riding device as in claim 4, wherein a wire extends from the first chassis part through the axle to the second chassis part, and the insert has a mount portion having a mount portion opening, wherein the wire is accessible through the axle aperture and mount portion opening.

6. A riding device as in claim 5, wherein a second wire extends through a portion of the axle and through the axle aperture into the mount portion of the insert.

7. A riding device as in claim 2, wherein the first chassis part defines the first footpad, and a first drive motor is configured to drive the first wheel about the chassis axis, and the second chassis part defines the second footpad, and a second drive motor is configured to drive the second wheel about the chassis axis, and additionally comprising a controller, the controller configured to direct operation of the first drive motor and the second drive motor depending on rotational positions of the first chassis part and second chassis part.

8. A riding device as in claim 1, wherein the insert comprises a mount portion configured to receive the mount post of the riding toy portion so that the riding toy portion is releasably attached to the insert.

9. A riding device as in claim 8, wherein the mount portion is sized and configured to receive a keyed portion of the mount post in a manner so that a position of the mount post relative to the insert is fixed.

10. A riding device as in claim 9, wherein the mount post has a non-circular cross section at the keyed portion, the mount post is elongated, and a major axis and a minor axis of the mount post generally increase along its length moving away from the keyed portion.

11. A riding device as in claim 1, wherein the wheel structure comprises a rolling wheel supported on a rotating mount, the rotating mount configured to rotate freely about an axis.

12. A riding device as in claim 8, configured so that when the riding toy is attached to the insert the saddle is behind the first chassis part and second chassis part and in front of the wheel structure.

13. A riding device as in claim 12, wherein the wheel structure comprises a rolling wheel supported on a rotating mount, the rolling wheel rotating about a wheel axis, the rotating mount rotating about a mount axis that does not intersect the wheel axis.

14. A riding device as in claim 13, wherein a first end of the insert faces the first chassis part inner end, and one of the insert first end and the first chassis part inner end comprises a pin extending therefrom, the other of the insert first end and the first chassis part inner end has an elongated slot formed therein, the slot having a slot first end and a slot second end, and the pin fits into the slot so that when the pin engages the slot first end the insert is blocked from rotating in a first rotational direction, and when the pin engages the slot second end the insert is blocked from rotating in a second rotational direction, but the insert rotates freely without restraint when the pin is between the slot first end and the slot second end.

15. A riding device as in claim 14, wherein the slot and the pin are configured so that rotation of the insert relative to the first chassis part is limited so that a receiver opening of the mount portion of the insert is always opening generally upwardly relative to the first footpad.

16. A riding device as in claim 8, additionally comprising a first rotation limiter operable between the insert and the first chassis part, the first rotation limiter configured to limit rotation of the first chassis part relative to the insert, and a second rotation limiter operable between the insert and the second chassis part, the second rotation limiter configured to limit rotation of the second chassis part relative to the insert, wherein the first rotation limiter and the second rotation limiter collectively limit rotation of the first chassis part relative to the second chassis part to within a selected range.

17. A riding device as in claim 16, wherein the first rotation limiter and the second rotation limiter are configured so that the mount portion of the insert remains generally upwardly-facing when the first chassis part rotates relative to the second chassis part within the selected range.

18. A riding device as in claim 1, wherein the elongated frame structure extends from a forward end to a rearward end, the mount post connects to the elongated frame structure forwardly of the saddle, and the back legs connect to the elongated frame structure rearwardly of the saddle.

19. A riding device as in claim 18, wherein the elongated frame structure defines an internal space and has a top portion and a bottom portion, and wherein the saddle is supported atop the top portion and the mount post connects to a mount structure in the bottom portion, the saddle being vertically spaced from the mount structure.

20. A riding device as in claim 19, wherein the forward end of the frame structure is rigidly connected to the rearward end of the frame structure.

21. A riding device as in claim 18, wherein the saddle is supported vertically spaced from the first footpad and second footpad so that a user seated on the saddle with feet on the first footpad and second footpad is in an upright seated position.

22. A powered wheeled riding device, comprising:
 a first chassis part defining a first footpad and supporting a first wheel and a first drive motor, the first chassis part configured to rotate about a chassis axis and terminating along the chassis axis at a first chassis part inner end disposed on a side of the first footpad opposite the first wheel;
 a second chassis part defining a second footpad and supporting a second wheel and a second drive motor, the second chassis part configured to rotate about the chassis axis and terminating along the chassis axis at a second chassis part inner end disposed on a side of the second footpad opposite the second wheel; and
 an insert sandwiched between the first chassis part inner end and the second chassis part inner end;
 wherein the first chassis part, second chassis part and insert are supported on an axle and configured to be rotatable relative to one another, the insert having a bottom aperture and being attached to the axle so as to move with the axle, an axle aperture of the axle aligned with the bottom aperture so as to provide access to an interior of the axle through the insert.

23. A riding device as in claim 22, wherein a first end of the insert faces the first chassis part inner end, a pin extends from the first chassis inner end and an elongated slot is formed in the insert first end, the elongated slot extending from a slot first end to a slot second end, the pin fitting into the slot so that the pin slides unrestrained within the slot between the slot first end and the slot second end as the insert rotates relative to the first chassis part, the pin sliding within the slot as the insert rotates relative to the first chassis part, and rotation of the insert relative to the first chassis part in a first direction is blocked when the pin is engaged with the slot first end, and rotation of the insert relative to the first chassis part in a second direction is blocked when the pin is engaged with the slot second end.

24. A riding device as in claim 23, wherein the bottom aperture of the insert opens generally upwardly when the pin is engaged with the slot first end, when the pin is engaged with the slot second end, and when the pin is between the slot first end and the slot second end.

25. A riding device as in claim 24, wherein the insert comprises an elongated post receiver extending from the insert, the post receiver being aligned with the bottom aperture of the insert, and wherein the post receiver extends upwardly relative to the first footpad when the pin is engaged with the slot first end, when the pin is engaged with the slot second end, and when the pin is between the slot first end and the slot second end.

26. A riding device as in claim 25, wherein a wire extends from the first chassis part through the axle to the second chassis part, and the wire is accessible through the bottom aperture of the insert.

27. A riding device as in claim 26, wherein a second wire extends through a portion of the axle and through the axle aperture and bottom aperture of the insert and into the post receiver.

28. A riding device as in claim 25, additionally comprising a riding toy portion comprising an elongated frame structure supporting a saddle configured to support a rider thereupon, a mount post depending from the frame structure and releasably attached to the insert via the post receiver, and a back leg depending from the frame structure, the back leg having a wheel structure attached thereto and spaced from the frame structure, wherein the saddle is behind the first chassis part and second chassis part and in front of the wheel structure.

29. A riding device as in claim 28, wherein the wheel structure comprises a rolling wheel supported on a rotating mount, the rolling wheel rotating about a wheel axis, the rotating mount rotating about a mount axis that is skew relative to the wheel axis.

30. A riding device as in claim 29, wherein the elongated frame structure extends from a forward end to a rearward end, the mount post connects to the elongated frame structure forwardly of the saddle, and the back legs connect to the elongated frame structure rearwardly of the saddle.

31. A riding device as in claim 30, wherein the saddle is supported vertically spaced from the first footpad and second footpad so that a user seated on the saddle with feet on the first footpad and second footpad is in an upright seated position.

* * * * *